US012647947B2

(12) United States Patent
Zhang

(10) Patent No.: US 12,647,947 B2
(45) Date of Patent: Jun. 2, 2026

(54) METHOD AND DEVICE IN NODES USED FOR WIRELESS COMMUNICATION

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 482 days.

(21) Appl. No.: 17/955,545

(22) Filed: Sep. 29, 2022

(65) Prior Publication Data

US 2023/0022663 A1 Jan. 26, 2023

Related U.S. Application Data

(63) Continuation of application No. PCT/CN2021/080962, filed on Mar. 16, 2021.

(30) Foreign Application Priority Data

Apr. 2, 2020 (CN) .......................... 202010255183.7
Apr. 17, 2020 (CN) .......................... 202010302776.4

(51) Int. Cl.
*H04W 72/044* (2023.01)
*H04L 5/00* (2006.01)
(Continued)

(52) U.S. Cl.
CPC ......... *H04W 72/044* (2013.01); *H04L 5/0005* (2013.01); *H04L 5/0053* (2013.01);
(Continued)

(58) Field of Classification Search
CPC ... H04W 72/044; H04W 72/56; H04W 72/21; H04W 72/569; H04L 5/0005; H04L 5/0053; H04L 5/0064
See application file for complete search history.

(56) References Cited

U.S. PATENT DOCUMENTS 10,959,247 B2 3/2021 Wang et al.
11,206,638 B2 12/2021 Wu et al.
(Continued)

FOREIGN PATENT DOCUMENTS

CN 110535555 A 12/2019
CN 110535569 A 12/2019
(Continued)

OTHER PUBLICATIONS

ISR received in application No. PCT/CN2021/080962 dated Jun. 2, 2021.
(Continued)

*Primary Examiner* — Jutai Kao
*Assistant Examiner* — Bradley D Lytle, Jr.
(74) *Attorney, Agent, or Firm* — Volpe Koenig

(57) ABSTRACT

A method and a device in a node for wireless communications. A first receiver receives first information; and a first transmitter transmits a first signal in a first time-frequency resource block, the first signal carrying a second bit block; herein, a first bit block is used for generating the second bit block; the first bit block comprises a first bit sub-block and a second bit sub-block, the priority corresponding to the first bit sub-block being higher than that corresponding to the second bit sub-block; the number of REs in the first time-frequency resource block used for transmitting the second bit block is no greater than a first value, and the number of bits comprised in the first bit sub-block is used to determine the first value; the number of bits comprised in the first bit sub-block and the first information are used together to determine a second value.

17 Claims, 8 Drawing Sheets

(51) Int. Cl.
    *H04W 72/56*     (2023.01)
    *H04W 72/21*     (2023.01)
    *H04W 72/566*     (2023.01)

(52) U.S. Cl.
    CPC ........... *H04L 5/0064* (2013.01); *H04W 72/56*
        (2023.01); *H04W 72/21* (2023.01); *H04W*
        *72/569* (2023.01)

(56) References Cited

U.S. PATENT DOCUMENTS

| | | | |
|---|---|---|---|
| 2012/0307760 | A1 | 12/2012 | Han et al. |
| 2015/0208400 | A1* | 7/2015 | Li ......................... H04W 72/20 |
| | | | 370/329 |
| 2019/0037586 | A1 | 1/2019 | Park |
| 2019/0098580 | A1* | 3/2019 | Babaei .................. H04W 72/56 |
| 2019/0199420 | A1 | 6/2019 | Faxér et al. |
| 2019/0261361 | A1 | 8/2019 | Xiong et al. |
| 2019/0313419 | A1 | 10/2019 | Fakoorian |
| 2019/0394758 | A1 | 12/2019 | Cheng |
| 2020/0092876 | A1 | 3/2020 | Cho |
| 2020/0288460 | A1* | 9/2020 | Kim ..................... H04L 1/0026 |
| 2021/0168846 | A1* | 6/2021 | Li ......................... H04L 5/0055 |

FOREIGN PATENT DOCUMENTS

| | | |
|---|---|---|
| CN | 110741577 A | 1/2020 |
| CN | 110808819 A | 2/2020 |
| WO | 2019072074 A1 | 4/2019 |
| WO | 2019144919 A1 | 8/2019 |
| WO | 2019192604 A1 | 10/2019 |
| WO | 2019242501 A1 | 12/2019 |
| WO | 2020041269 A1 | 2/2020 |
| WO | 2020056726 A1 | 3/2020 |
| WO | 2020067750 A1 | 4/2020 |

OTHER PUBLICATIONS

First Search Report of Chinses patent application No. CN202010255183.7 dated Mar. 11, 2022.
First Search Report of Chinses patent application No. CN202010302776.4 dated Mar. 14, 2022.
Notification to Grant Patent Right for Invention of Chinses patent application No. CN202010255183.7 dated Jul. 18, 2022.
Notification to Grant Patent Right for Invention of Chinses patent application No. CN202010302776.4 dated Jul. 18, 2022.
First Office Action of Chinses patent application No. CN202010255183.7 dated Mar. 17, 2022.
First Office Action of Chinses patent application No. CN202010302776.4 dated Mar. 18, 2022.
Nokia, Nokia Shanghai Bell "Summary of contributions on UL/DL intra-UE prioritization/multiplexing" 3GPP TSG-RAN WG1 #96 R1-1903369 Feb. 25, 2019.
Asia Pacific Telecom co. Ltd"Consideration of configured grant timer for Intra-UE prioritization"3GPP TSG-RAN WG2 Meeting #109 R2-2000722 Feb. 14, 2020.
Nokia, Nokia Shanghai Bell "On UCI Enhancements for NR URLLC" 3GPP TSG RAN WG1 #99 R1-1912512 Nov. 9, 2019.
LG Electronics "Discussion on resource conflict between PUSCHs"3GPP TSG RAN WG1 #96 R1-1904633 Apr. 3, 2019.
Huawei et al., "UCI enhancements for URLLC," 3GPP TSG RAN WG1 Meeting #96b, R1-1903955, Xi'an, China (Aug. 8-12, 2019).
Third Generation Partnerships Project, "Technical Specification Group Radio Access Network; NR; Multiplexing and channel coding (Release 16)," 3GPP TS 38.212 V16.0.0 (Dec. 2019).
Third Generation Partnerships Project, "Technical Specification Group Radio Access Network; NR; Physical layer procedures for control (Release 15)," 3GPP TS 38.213 V16.0.0 (Dec. 2019).
Third Generation Partnerships Project, "Technical Specification Group Radio Access Network; NR; Physical layer procedures for data (Release 16)," 3GPP TS 38.214 V16.0.0 (Dec. 2019).

* cited by examiner

100A

100B

```
┌─────────────────────┐                    ┌─────────────────────┐
│  Second node U2B    │                    │   First node U1B    │
└─────────────────────┘                    └─────────────────────┘
┌─────────────────────┐
│ S521B.transmitting second │
│      signaling      │
└─────────────────────┘
            ├────────────second signaling──────────►
                                           ┌─────────────────────┐
                                           │ S511B.receiving second │
                                           │      signaling      │
                                           └─────────────────────┘
┌─────────────────────┐
│ S522B.transmitting first signaling │
└─────────────────────┘
            ├────────────first signaling──────────►
                                           ┌─────────────────────┐
                                           │ S512B.receiving first signaling │
                                           └─────────────────────┘
┌─────────────────────┐
│ S5201B.transmitting first signal │
└─────────────────────┘
            ├────────────first signal──────────►
                                           ┌─────────────────────┐
                                           │ S5101B.receiving first signal │
                                           └─────────────────────┘
                                                          F1B
                                                       optional
                                           ┌─────────────────────┐
                                           │ S513B.transmitting target signal │
                                           │ in target radio resource block │
                                           └─────────────────────┘
            ◄────────────target signal──────────┤
┌─────────────────────┐
│ S523B.receiving target signal in │
│  target radio resource block │
└─────────────────────┘

( End )                                    ( End )
```

FIG. 5B

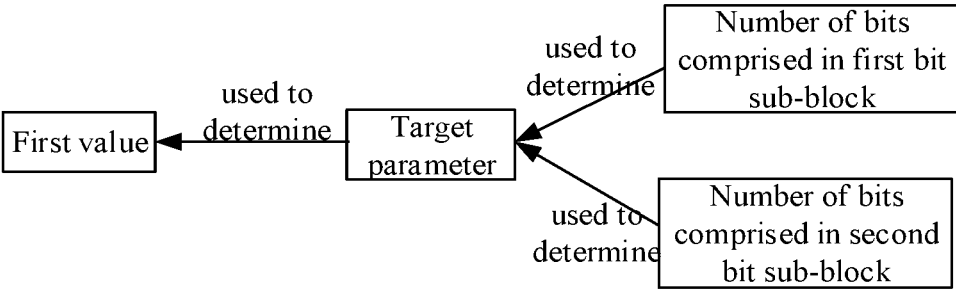

METHOD AND DEVICE IN NODES USED FOR WIRELESS COMMUNICATION

CROSS REFERENCE TO RELATED APPLICATIONS

This application is the continuation of the International Patent application No. PCT/CN2021/080962, filed on Mar. 16, 2021, which claims the priority benefit of Chinese Patent Application No. 202010255183.7, filed on Apr. 2, 2020, and claims the priority benefit of Chinese Patent Application No. 202010302776.4, filed on Apr. 17, 2020, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In the 5G system, Enhance Mobile Broadband (eMBB) and Ultra Reliable and Low Latency Communication (URLLC) are two typical service types. Targeting the request for a lower target BLER (i.e., $10^-5$) in URLLC services, the 3rd Generation Partner Project (3GPP) has defined a new Modulation and Coding Scheme (MCS) in New Radio (NR) Release 15. To support more demanding URLLC traffics, for instance, with higher reliability (e.g., the target BLER is $10^-6$), lower latency (e.g., 0.5-1 ms) and so on, a Downlink Control Information (DCI) signaling can, as defined in the 3GPP NR Release 16, indicate whether services being scheduled is of Low Priority or High Priority, where the Low Priority is for URLLC services while the High Priority is for eMBB services. When a transmission of Low Priority is overlapping with a transmission of High Priority, the High-priority transmission is performed and the Low-priority one is dropped.

A Work Item (WI) of URLLC advancement in NR Release 17 was approved by the 3GPP RAN Plenary #86. The WI is proceeded with a focus of study on the Multiplexing of different intra-User-Equipment (Intra-UE) services with high and low priorities.

SUMMARY

To support the multiplexing inside the User Equipment (UE) (i.e., Intra-UE multiplexing) of high-priority and low-priority services, how to design transmission of a Hybrid Automatic Repeat reQuest Acknowledgment (HARQ-ACK) Codebook on a Physical Uplink Shared CHannel (PUSCH) is a key issue to be addressed.

To support the Intra-UE multiplexing of high-priority and low-priority services, how to multiplex Uplink Control Information (UCI) on the PUSCH in the case when collisions occur between a Physical Uplink Shared CHannel (PUSCH) and a Physical Uplink Control CHannel (PUCCH) in time domain is a key issue to be addressed.

To address the above problem, the present application provides a solution. In the statement above, the Uplink (UL) is taken only for example; And the present application is also applicable to the scenarios of Downlink (DL) transmission and Sidelink transmission, where similar technical effects can be achieved. Additionally, the adoption of a unified solution for various scenarios, including but not limited to UL, DL and SL, contributes to the reduction of hardcore complexity and costs. It should be noted that if no conflict is incurred, embodiments in a User Equipment (UE) in the present application and the characteristics of the embodiments are also applicable to a base station, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving first information;

transmitting a first signal in a first time-frequency resource block, the first signal carrying a second bit block;

herein, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block (size of the first bit sub-block) being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

In one embodiment, a problem to be solved in the present application is: how to allocate resources between control information and service data when control information of high and low priorities are multiplexed on a same channel used for transmitting service data.

In one embodiment, a problem to be solved in the present application is: how can Uplink Control Information (UCI) of different priorities be multiplexed on a PUSCH.

In one embodiment, a problem to be solved in the present application is: UCIs of high and low priorities (for instance, HARQ-ACK codebooks of high and low priorities) are respectively configured with different scaling parameters; when the UCIs of high and low priorities are multiplexed on a same PUSCH, how to rationally utilize transmission resources occupied by the UCIs limited by the configured multiple scaling parameters.

In one embodiment, the essence of the above method lies in that UCIs of high and low priorities (for instance, HARQ-ACK codebooks of high and low priorities) are respectively configured with different scaling parameters; a Payload Size of high-priority UCI is used to determine which one of the multiple scaling parameters is to be used to determine an upper limit of transmission resources occupied by the UCI.

In one embodiment, the essence of the above method lies in that scaling parameters corresponding to UCIs of high and low priorities (for instance, HARQ-ACK codebooks of high and low priorities) are respectively used to determine upper limits of different resources that can be occupied; when the quantity of resources required by high-priority UCI is larger than an upper limit of the resources that can be occupied determined by the scaling parameter corresponding to low-priority UCI, the scaling parameter corresponding to the high-priority UCI is used to determine an upper limit of transmission resources occupied by the UCIs; otherwise, the scaling parameter corresponding to low-priority UCI is used to determine an upper limit of transmission resources occupied by the UCIs.

In one embodiment, the essence of the above method lies in that UCIs of high and low priorities (for instance, HARQ-ACK codebooks of high and low priorities) are respectively configured with different scaling parameters; a Payload Size of high-priority UCI and a Payload Size of low-priority UCI are jointly used to determine which one of the multiple scaling parameters is to be used to determine an upper limit of transmission resources occupied by the UCI.

In one embodiment, the above method is advantageous in that when UCIs of high and low priorities (for instance, HARQ-ACK codebooks of high and low priorities) are multiplexed on a same PUSCH, by allocating transmission resources between UCIs and service data carried by a PUSCH in a more rational way according to priority information, the reliability of high-priority control information or high-priority service data can be guaranteed.

In one embodiment, the above method is advantageous in that when high-priority control information and low-priority control information are multiplexed on a same channel, by allocating transmission resources between the control information and service data in a more rational way according to priority information, the reliability of high-priority control information or high-priority service data can be guaranteed.

According to one aspect of the present application, the above method is characterized in that, the first value is unrelated to the first information.

According to one aspect of the present application, the above method is characterized in that, the first value is no greater than a first candidate value and no less than a second candidate value; a first parameter is used to determine the first candidate value, while a second parameter is used to determine the second candidate value; the first parameter and the second parameter respectively correspond to a first priority and a second priority; the priority corresponding to the first bit sub-block is the first priority, and the priority corresponding to the second bit sub-block is the second priority.

According to one aspect of the present application, the above method is characterized in that, a target parameter is used to determine the first value; the target parameter is a first parameter or a second parameter, the first parameter and the second parameter respectively corresponding to a first priority and a second priority; the priority corresponding to the first bit sub-block is the first priority, and the priority corresponding to the second bit sub-block is the second priority; the number of bits comprised in the first bit sub-block and a number of bits comprised in the second bit sub-block (size of the second bit sub-block) are used together to determine the target parameter.

According to one aspect of the present application, the above method is characterized in that, when a second value is greater than the second candidate value, the first value is the first candidate value; when the second value is no greater than the second candidate value, the first value is the second candidate value.

According to one aspect of the present application, the above method is characterized in comprising:

receiving a first signaling and a second signaling;

herein, the first signaling indicates a first radio resource block, while the second signaling indicates a second radio resource block; at least one of the first radio resource block or the second radio resource block is overlapping with the first time-frequency resource block in time domain.

According to one aspect of the present application, the above method is characterized in that, the first signal carries a third bit block; the first time-frequency resource block is a time-frequency resource block configured for the third bit block; the third bit block is the first-type bit block between a first-type bit block and a second-type bit block.

The present application provides a method in a second node for wireless communications, comprising:

transmitting first information; and receiving a first signal in a first time-frequency resource block, the first signal carrying a second bit block;

herein, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

According to one aspect of the present application, the above method is characterized in that, the first value is unrelated to the first information.

According to one aspect of the present application, the above method is characterized in that, the first value is no greater than a first candidate value and no less than a second candidate value; a first parameter is used to determine the first candidate value, while a second parameter is used to determine the second candidate value; the first parameter and the second parameter respectively correspond to a first priority and a second priority; the priority corresponding to the first bit sub-block is the first priority, and the priority corresponding to the second bit sub-block is the second priority.

According to one aspect of the present application, the above method is characterized in that, a target parameter is used to determine the first value; the target parameter is a first parameter or a second parameter, the first parameter and the second parameter respectively corresponding to a first priority and a second priority; the priority corresponding to the first bit sub-block is the first priority, and the priority corresponding to the second bit sub-block is the second priority; the number of bits comprised in the first bit sub-block and a number of bits comprised in the second bit sub-block are used together to determine the target parameter.

According to one aspect of the present application, the above method is characterized in that, when a second value is greater than the second candidate value, the first value is the first candidate value; when the second value is no greater than the second candidate value, the first value is the second candidate value.

According to one aspect of the present application, the above method is characterized in comprising:

transmitting a first signaling and a second signaling;

herein, the first signaling indicates a first radio resource block, while the second signaling indicates a second radio resource block; at least one of the first radio resource block or the second radio resource block is overlapping with the first time-frequency resource block in time domain.

According to one aspect of the present application, the above method is characterized in that, the first signal carries a third bit block; the first time-frequency resource block is a time-frequency resource block configured for the third bit block; the third bit block is the first-type bit block between a first-type bit block and a second-type bit block.

The present application provides a first node for wireless communications, comprising:

a first receiver, receiving first information; and a first transmitter, transmitting a first signal in a first time-frequency resource block, the first signal carrying a second bit block;

herein, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

The present application provides a second node for wireless communications, comprising:

a second transmitter, transmitting first information; and a second receiver, receiving a first signal in a first time-frequency resource block, the first signal carrying a second bit block;

herein, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

In one embodiment, the method in the present application has the following advantages:

allocating transmission resources more rationally between control information and service data according to priority information when control information of different priorities are multiplexed on a same channel;

allocating transmission resources more rationally between UCIs and service data carried by the PUSCH according to priority information when UCIs of different priorities (i.e., HARQ-ACK codebooks of different priorities) are multiplexed on a same channel;

optimizing transmission resource allocation between control information and service data according to the payload size of high-priority control information;

ensuring the reliability of high-priority control information or high-priority service data.

The present application provides a method in a first node for wireless communications, comprising:

receiving a first signaling and a second signaling, the first signaling and the second signaling respectively being used to determine a first radio resource block and a second radio resource block; and transmitting a target signal in a target radio resource block;

herein, the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block (size of the first bit block) is used to determine a second time; the second time is no earlier than the first time in time domain; a time gap between the second time and the first time is used to determine whether bits in the second bit block are used for generating the target signal; the first bit block and the second bit block respectively correspond to different types.

In one embodiment, a problem to be solved in the present application includes: how to multiplex a high-priority UCI on a low-priority PUSCH in the case that a high-priority PUCCH and the low-priority PUSCH are overlapping in time domain.

In one embodiment, a problem to be solved in the present application includes: how to achieve optimization of UE UL transmission under the constraint of satisfying the delay requirement of high-priority information when handling collisions of high- and low-priority information.

In one embodiment, the essence of the above method lies in that when a high-priority PUCCH and a low-priority PUSCH are overlapping in time domain: if there is no extra delay generated as a high-priority UCI is multiplexed on the low-priority PUSCH to be transmitted, the UE will determine to multiplex the high-priority UCI on the low-priority PUSCH for transmission; otherwise, the UE determines to transmit the high-priority UCI on the high-priority PUCCH.

In one embodiment, the essence of the above method lies in that when a high-priority PUCCH and a low-priority PUSCH are overlapping in time domain: if there is an acceptable extra delay produced as a high-priority UCI is multiplexed on the low-priority PUSCH to be transmitted, the UE will determine to multiplex the high-priority UCI on the low-priority PUSCH for transmission; otherwise, the UE determines to transmit the high-priority UCI on the high-priority PUCCH.

In one embodiment, the essence of the above method lies in that when a high-priority channel and a low-priority channel are overlapping in time domain: if there is an acceptable extra delay produced as high-priority information is multiplexed on the low-priority channel to be transmitted, the UE will determine to multiplex the high-priority information on the low-priority channel for transmission; otherwise, the UE determines to transmit the high-priority information on the high-priority channel and drop low-priority information.

In one embodiment, the essence of the above method lies in that when a high-priority channel and a low-priority channel are overlapping in time domain: if there is no extra delay produced as high-priority information is multiplexed on the low-priority channel to be transmitted, the UE will determine to multiplex the high-priority information on the low-priority channel for transmission; otherwise, the UE determines to transmit the high-priority information on the high-priority channel and drop low-priority information.

In one embodiment, the above method is advantageous in ensuring the delay requirement of high-priority control information (e.g., UCI).

In one embodiment, the above method is advantageous in that in the case when the delay requirement of high-priority control information (e.g., UCI) is satisfied, low-priority service data/control information can also be transmitted in a low-priority channel; Such method improves the transmission efficiency compared with the practice of directly dropping low-priority service data/control information.

According to one aspect of the present application, the above method is characterized in that, the second time is after the first time in time domain.

According to one aspect of the present application, the above method is characterized in that, when a time gap between the second time and the first time is no greater than a first threshold, bits in the second bit block are used for generating the target signal, the target radio resource block being the second radio resource block; when a time gap between the second time and the first time is greater than the first threshold, bits in the second bit block are not used for generating the target signal, the target radio resource block being the first radio resource block.

According to one aspect of the present application, the above method is characterized in that, the first threshold is greater than 0.

According to one aspect of the present application, the above method is characterized in that, when bits comprised in the second bit block are used for generating the target signal, the second time is an end time of time-domain resources occupied by a modulation symbol generated by the first bit block; the second time is before an end time of the second radio resource block in time domain.

According to one aspect of the present application, the above method is characterized in comprising:

8 receiving a first signal;

herein, the first signal carries a third bit block, the first signaling comprising scheduling information of the third bit block, the first bit block comprising information indicating whether the third bit block is correctly received.

According to one aspect of the present application, the above method is characterized in that, when bits comprised in the second bit block are used for generating the target signal, time-domain resources before those occupied by a reference signal which is earliest in time domain in the target radio resource block are used for transmitting bits associated with the first bit block.

The present application provides a method in a second node for wireless communications, comprising:

transmitting a first signaling and a second signaling, the first signaling and the second signaling respectively being used to determine a first radio resource block and a second radio resource block; and receiving a target signal in a target radio resource block; herein, the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block (size of the first bit block) is used to determine a second time; the second time is no earlier than the first time in time domain; a time gap between the second time and the first time is used to determine whether bits in the second bit block are used for generating the target signal; the first bit block and the second bit block respectively correspond to different types.

According to one aspect of the present application, the above method is characterized in that, the second time is after the first time in time domain.

According to one aspect of the present application, the above method is characterized in that, when a time gap between the second time and the first time is no greater than a first threshold, bits in the second bit block are used for generating the target signal, the target radio resource block being the second radio resource block; when a time gap between the second time and the first time is greater than the first threshold, bits in the second bit block are not used for generating the target signal, the target radio resource block being the first radio resource block.

According to one aspect of the present application, the above method is characterized in that, the first threshold is greater than 0.

According to one aspect of the present application, the above method is characterized in that, when bits comprised in the second bit block are used for generating the target signal, the second time is an end time of time-domain resources occupied by a modulation symbol generated by the first bit block; the second time is before an end time of the second radio resource block in time domain.

According to one aspect of the present application, the above method is characterized in comprising:

transmitting a first signal;

herein, the first signal carries a third bit block, the first signaling comprising scheduling information of the third bit block, the first bit block comprising information indicating whether the third bit block is correctly received.

According to one aspect of the present application, the above method is characterized in that, when bits comprised in the second bit block are used for generating the target signal, time-domain resources before those occupied by a reference signal which is earliest in time domain in the target radio resource block are used for transmitting bits associated with the first bit block.

The present application provides a first node for wireless communications, comprising:

a first receiver, receiving a first signaling and a second signaling, the first signaling and the second signaling respectively being used to determine a first radio resource block and a second radio resource block; and a first transmitter, transmitting a target signal in a target radio resource block;

herein, the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block is used to determine a second time; the second time is no earlier than the first time in time domain; a time gap between the second time and the first time is used to determine whether bits in the second bit block are used for generating the target signal; the first bit block and the second bit block respectively correspond to different types.

The present application provides a second node for wireless communications, comprising:

a second transmitter, transmitting a first signaling and a second signaling, the first signaling and the second signaling respectively being used to determine a first radio resource block and a second radio resource block; and a second receiver, receiving a target signal in a target radio resource block;

herein, the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block is used to determine a second time; the second time is no earlier than the first time in time domain; a time gap between the second time and the first time is used to determine whether bits in the second bit block are used for generating the target signal; the first bit block and the second bit block respectively correspond to different types.

In one embodiment, the method in the present application has the following advantages:

optimizing uplink transmission of the UE under the limitation of satisfying the delay requirement of high-priority information during the handling of colliding transmissions of high- and low-priority information;

ensuring the performance requirements (delay, etc.) of high-priority information, such as UCI;

when collisions occur during transmissions of information of different priorities, on the condition that the delay requirement of high-priority information (UCI, for instance) is fulfilled, low-priority service data/control information can be transmitted on a low-priority channel; increasing the transmission efficiency compared with the practice of directly dropping low-priority service data/control information.

BRIEF DESCRIPTION OF THE DRAWINGS

Other features, objects and advantages of the present application will become more apparent from the detailed description of non-restrictive embodiments taken in conjunction with the following drawings:

FIG. 5B illustrates a flowchart of signal transmission according to one embodiment of the present application.

FIG. 6A illustrates a schematic diagram of relations among a number of bits comprised in a first bit sub-block, a number of bits comprised in a second bit sub-block, a target parameter and a first value according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
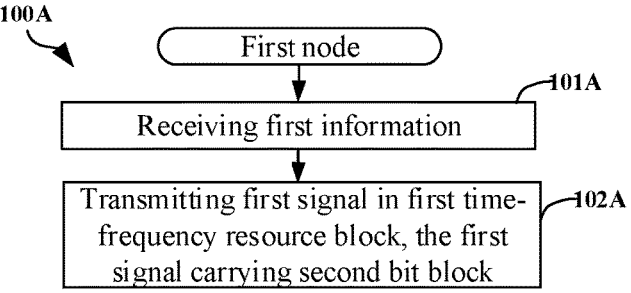
FIG. 1A illustrates a flowchart of processing of a first node according to one embodiment of the present application.

Embodiment 1A illustrates a flowchart of processing of a first node according to one embodiment of the present application, as shown in FIG. 1A.

In Embodiment 1A, the first node in the present application receives first information in step 101A; and transmits a first signal in a first time-frequency resource block in step 102A, the first signal carrying a second bit block.

In Embodiment 1A, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

In one embodiment, the first signal is a radio signal.

In one embodiment, the first signal is a baseband signal.

In one embodiment, the first signal is a radio frequency signal.

In one embodiment, the first time-frequency resource block is a PUSCH.

In one embodiment, the first time-frequency resource block comprises a PUSCH.

In one embodiment, the first time-frequency resource block comprises a short PUSCH (sPUSCH).

In one embodiment, the first time-frequency resource block comprises a Narrow Band PUSCH (NB-PUSCH).

In one embodiment, the first time-frequency resource block is resources configured for service data transmission.

In one embodiment, the first time-frequency resource block comprises a positive integer number of Resource Element(s) (RE(s)).

In one embodiment, an RE occupies a multicarrier symbol in time domain, and a subcarrier in frequency domain.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first time-frequency resource block comprises a positive integer number of subcarrier(s) in frequency domain.

In one embodiment, the first time-frequency resource block comprises a positive integer number of Physical Resource Block(s) (PRB(s)) in frequency domain.

In one embodiment, the first time-frequency resource block comprises a positive integer number of Resource Block(s) (RB(s)) in frequency domain.

In one embodiment, the first time-frequency resource block comprises a positive integer number of multicarrier symbol(s) in time domain.

In one embodiment, the first time-frequency resource block comprises a positive integer number of slot(s) in time domain.

In one embodiment, the first time-frequency resource block comprises a positive integer number of sub-slot(s) in time domain.

In one embodiment, the first time-frequency resource block comprises a positive integer number of sub-millisecond(s) (ms) in time domain.

In one embodiment, the first time-frequency resource block comprises a positive integer number of non-consecutive slots in time domain.

In one embodiment, the first time-frequency resource block comprises a positive integer number of consecutive slots in time domain.

In one embodiment, the first time-frequency resource block comprises a positive integer number of sub-frame(s) in time domain.

In one embodiment, the first time-frequency resource block is configured by a higher layer signaling.

In one embodiment, the first time-frequency resource block is configured by a Radio Resource Control (RRC) signaling.

In one embodiment, the first time-frequency resource block is configured by a Medium Access Control layer Control Element (MAC CE) signaling.

In one embodiment, the first time-frequency resource block is pre-configured.

In one embodiment, a number of multicarrier symbols comprised in the first time-frequency resource block in time domain is configured by a higher layer signaling.

In one embodiment, a number of multicarrier symbols comprised in the first time-frequency resource block in time domain is configured by an RRC signaling.

In one embodiment, a number of multicarrier symbols comprised in the first time-frequency resource block in time domain is configured by a MAC CE signaling.

In one embodiment, the Resource Element is an RE.

In one embodiment, the Resource Element comprises an RE.

In one embodiment, the Resource Element comprises an RB.

In one embodiment, the Resource Element comprises a subcarrier in frequency domain.

In one embodiment, the Resource Element comprises a multicarrier symbol in time domain.

In one embodiment, the second bit block comprises control information.

In one embodiment, the second bit block comprises UCI.

In one embodiment, the second bit block comprises a HARQ-ACK codebook.

In one embodiment, the second bit block comprises a Channel State Information (CSI) report.

In one embodiment, the second bit block comprises a positive integer number of bit(s).

In one embodiment, the first bit block comprises control information.

In one embodiment, the first bit block comprises UCI.

In one embodiment, the first bit block comprises a HARQ-ACK codebook.

In one embodiment, the first bit block comprises a positive integer number of bit(s).

In one embodiment, the first bit block comprises a CSI report.

In one embodiment, the first bit sub-block comprises UCI.

In one embodiment, the second bit sub-block comprises UCI.

In one embodiment, a priority corresponding to the first bit sub-block is High Priority, and a priority corresponding to the second bit sub-block is Low Priority.

In one embodiment, the first bit sub-block comprises a high-priority HARQ-ACK codebook, while the second bit sub-block comprises a low-priority HARQ-ACK codebook.

In one embodiment, the second bit sub-block comprises a CSI report.

In one embodiment, the first bit sub-block and the second bit sub-block respectively comprise HARQ-ACK codebooks of different priorities.

In one embodiment, the first bit sub-block comprises a URLLC Service Type HARQ-ACK codebook, while the second bit sub-block comprises an eMBB Service Type HARQ-ACK codebook.

In one embodiment, the first bit sub-block and the second bit sub-block respectively comprise HARQ-ACK codebooks of different service types.

In one embodiment, the first bit sub-block and the second bit sub-block are respectively used for different communication modes.

In one embodiment, a number of bits comprised in the first bit sub-block is used for selecting the first value from multiple candidate values.

In one embodiment, the first node receives a third signaling; the third signaling indicates the first information.

In one embodiment, the first node receives a third signaling; the third signaling comprises a first field, the first field indicating the first information.

In one embodiment, the first node receives a third signaling; a beta_offset indicator field in the third signaling indicates the first information.

In one embodiment, the first node receives a third signaling; the third signaling indicates second information, the second information being used together with a number of bits in the second bit sub-block to determine a third value.

In one subembodiment, a beta_offset indicator field in the third signaling indicates the second information.

In one subembodiment, the second value, the third value and the first value are used together to determine a number of REs in the first time-frequency resource block used for transmitting bits associated with the second bit sub-block comprised in the second bit block.

In one embodiment, the first bit sub-block comprises high-priority UCI.

In one embodiment, the second bit sub-block comprises low-priority UCI.

In one embodiment, the first bit sub-block comprises a high-priority Scheduling Request (SR).

In one embodiment, a number of bits comprised in the first bit sub-block is equal to a Payload Size of high-priority UCI.

In one subembodiment, the Payload Size of the high-priority UCI is a CRC-including payload size.

In one subembodiment, the Payload Size of the high-priority UCI is a CRC-excluding payload size.

In one subembodiment, the high-priority UCI comprises a high-priority HARQ-ACK codebook.

In one embodiment, a number of bits comprised in the second bit sub-block is equal to a Payload Size of low-priority UCI.

In one subembodiment, the Payload Size of the low-priority UCI is a CRC-including payload size.

In one subembodiment, the Payload Size of the low-priority UCI is a CRC-excluding payload size.

In one subembodiment, the low-priority UCI comprises a low-priority HARQ-ACK codebook.

Embodiment 1B

Figure 1B:
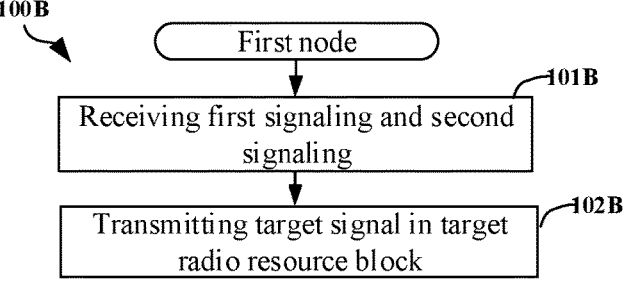
FIG. 1B illustrates a flowchart of processing of a first node according to one embodiment of the present application.

Embodiment 1B illustrates a flowchart of processing of a first node according to one embodiment of the present application, as shown in FIG. 1B.

In Embodiment 1B, the first node in the present application receives a first signaling and a second signaling in step 101B; and transmits a target signal in a target radio resource block in step 102B.

In Embodiment 1B, the first signaling and the second signaling are respectively used to determine a first radio resource block and a second radio resource block; and the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block is used to determine a second time; the second time is no earlier than the first time in time domain; a time gap between the second time and the first time is used to determine whether bits in the second bit block are used for generating the target signal; the first bit block and the second bit block respectively correspond to different types.

In one embodiment, the target signal is a radio signal.

In one embodiment, the target signal is a baseband signal.

In one embodiment, the target signal is a radio frequency signal.

In one embodiment, all bits in the first bit block are used for generating the target signal.

In one embodiment, partial bits in the first bit block are used for generating the target signal.

In one embodiment, all or partial bits in the first bit block being through the bundling operation are used for generating the target signal.

In one embodiment, all or partial bits in the first bit block being through the Logical Conjunction (Logical AND) operation are used for generating the target signal.

In one embodiment, all or partial bits in the first bit block being through the Logical Disjunction (Logical OR) operation are used for generating the target signal.

In one embodiment, all or partial bits in the first bit block being through the Logical Exclusive OR (Logical XOR) operation are used for generating the target signal.

In one embodiment, the target signal is an output by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the target signal comprises a first sub-signal; the first sub-signal is an output by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the target signal is an output by all or part of bits in the first bit block, after being processed by the bundling operation, sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the target signal comprises a first sub-signal; the first sub-signal is an output by all or part of bits in the first bit block, after being processed by the bundling operation, sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the target signal is an output by bits generated by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the target signal comprises a first sub-signal; the first sub-signal is an output by bits generated by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, when bits in the second bit block are used for generating the target signal, bits associated with the second bit block carried by the target signal and bits associated with the first bit block carried by the target signal respectively use independent channel codings.

In one subembodiment, the bits associated with the first bit block carried by the target signal use a Polar code for channel coding.

In one subembodiment, the bits associated with the first bit block carried by the target signal use a Block code for channel coding.

In one subembodiment, the bits associated with the second bit block carried by the target signal use a LDPC code for channel coding.

In one embodiment, the first signaling explicitly indicates the first radio resource block.

In one embodiment, the second signaling explicitly indicates the second radio resource block.

In one embodiment, a field in the first signaling indicates the first radio resource block.

In one embodiment, a field in the second signaling indicates the second radio resource block.

In one embodiment, a first signaling set comprises a positive integer number of signalings, with the first signaling being a signaling ranking last in the first signaling set, the first bit block comprising a Hybrid Automatic Repeat reQuest Acknowledgement (HARQ-ACK) bit corresponding to the positive integer number of signalings in the first signaling set.

In one embodiment, the first signaling comprises scheduling information of the first bit block, the scheduling information indicating the first radio resource block.

In one embodiment, the first signaling indicates the first radio resource block in a first radio resource set, where a number of bits comprised in the first bit block is used to determine the first radio resource set.

In one embodiment, the second signaling comprises scheduling information of the second bit block, the scheduling information indicating the second radio resource block.

In one embodiment, the first signaling is dynamically configured.

In one embodiment, the first signaling is a Physical Layer signaling.

In one embodiment, the first signaling is a Downlink (DL) Grant.

In one embodiment, the first signaling is a Downlink Control Information (DCI) signaling.

In one embodiment, the first signaling comprises one or more fields in a DCI.

In one embodiment, the first signaling is transmitted in a downlink physical layer control channel (i.e., a downlink channel only capable of bearing physical layer signaling).

In one embodiment, the first signaling is DCI format 1_0, for the specific definition of the DCI format 1_0, refer to 3GPP TS38.212, Chapter 7.3.1.2.

In one embodiment, the first signaling is DCI format 1_1, for the specific definition of the DCI format 1_1, refer to 3GPP TS38.212, Chapter 7.3.1.2.

In one embodiment, the first signaling is DCI format 1_2, for the specific definition of the DCI format 1_2, refer to 3GPP TS38.212, Chapter 7.3.1.2.

In one embodiment, the first signaling comprises a signaling used for indicating a Semi-Persistent Scheduling (SPS) Release.

In one embodiment, the first signaling comprises a signaling used for indicating configuration information for a downlink physical layer data channel.

In one embodiment, the first signaling comprises a signaling used for indicating configuration information for a Physical Downlink Shared Channel (PDSCH).

In one embodiment, the first signaling comprises a signaling used for scheduling a downlink physical layer data channel.

In one embodiment, the first signaling comprises a signaling used for scheduling a PDSCH.

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, the downlink physical layer data channel is a PDSCH.

In one embodiment, the downlink physical layer data channel is a short PDSCH (sPDSCH).

In one embodiment, the downlink physical layer data channel is a Narrow Band PDSCH (NB-PDSCH).

In one embodiment, the second signaling is dynamically configured.

In one embodiment, the second signaling is a physical layer signaling.

In one embodiment, the second signaling is a Downlink (DL) Grant.

In one embodiment, the second signaling is DCI.

In one embodiment, the second signaling comprises one or more fields in a DCI.

In one embodiment, the second signaling is transmitted in a downlink physical layer control channel (i.e., a downlink channel only capable of bearing physical layer signaling).

In one embodiment, the second signaling is DCI format 1_0, for the specific definition of the DCI format 1_0, refer to 3GPP TS38.212, Chapter 7.3.1.2.

In one embodiment, the second signaling is DCI format 1_1, for the specific definition of the DCI format 1_1, refer to 3GPP TS38.212, Chapter 7.3.1.2.

In one embodiment, the second signaling is DCI format 1_2, for the specific definition of the DCI format 1_2, refer to 3GPP TS38.212, Chapter 7.3.1.2.

In one embodiment, the second signaling comprises a signaling used for indicating an SPS Release.

In one embodiment, the second signaling comprises a signaling used for indicating configuration information for a downlink physical layer data channel.

In one embodiment, the second signaling comprises a signaling used for indicating configuration information for a PDSCH.

In one embodiment, the second signaling comprises a signaling used for scheduling a downlink physical layer data channel.

In one embodiment, the second signaling comprises a signaling used for scheduling a PDSCH.

In one embodiment, the downlink physical layer control channel is a PDCCH.

In one embodiment, the downlink physical layer control channel is a sPDCCH.

In one embodiment, the downlink physical layer control channel is an NB-PDCCH.

In one embodiment, the downlink physical layer data channel is a PDSCH.

In one embodiment, the downlink physical layer data channel is a sPDSCH.

In one embodiment, the downlink physical layer data channel is an NB-PDSCH.

In one embodiment, the first radio resource block comprises a positive integer number of Resource Element(s) (RE(s)).

In one embodiment, a said RE occupies a multicarrier symbol in time domain, and a subcarrier in frequency domain.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first radio resource block comprises a positive integer number of subcarrier(s) in frequency domain.

In one embodiment, the first radio resource block comprises a positive integer number of Physical Resource Block (s) (PRB(s)) in frequency domain.

In one embodiment, the first radio resource block comprises a positive integer number of Resource Block(s) (RB (s)) in frequency domain.

In one embodiment, the first radio resource block comprises a positive integer number of multicarrier symbol(s) in time domain.

In one embodiment, the first radio resource block comprises a positive integer number of slot(s) in time domain.

In one embodiment, the first radio resource block comprises a positive integer number of sub-slot(s) in time domain.

In one embodiment, the first radio resource block comprises a positive integer number of sub-millisecond(s) (ms) in time domain.

In one embodiment, the first radio resource block comprises a positive integer number of non-consecutive slots in time domain.

In one embodiment, the first radio resource block comprises a positive integer number of consecutive slots in time domain.

In one embodiment, the first radio resource block comprises a positive integer number of sub-frame(s) in time domain.

In one embodiment, the first radio resource block is configured by a higher layer signaling.

In one embodiment, the first radio resource block is configured by a Radio Resource Control (RRC) signaling.

In one embodiment, the first radio resource block is configured by a Medium Access Control layer Control Element (MAC CE) signaling.

In one embodiment, the second radio resource block comprises a positive integer number of RE(s).

In one embodiment, the second radio resource block comprises a positive integer number of subcarrier(s) in frequency domain.

In one embodiment, the second radio resource block comprises a positive integer number of PRB(s) in frequency domain.

In one embodiment, the second radio resource block comprises a positive integer number of RB(s) in frequency domain.

In one embodiment, the second radio resource block comprises a positive integer number of multicarrier symbol(s) in time domain.

In one embodiment, the second radio resource block comprises a positive integer number of slot(s) in time domain.

In one embodiment, the second radio resource block comprises a positive integer number of sub-slot(s) in time domain.

In one embodiment, the second radio resource block comprises a positive integer number of sub-millisecond(s) in time domain.

In one embodiment, the second radio resource block comprises a positive integer number of non-consecutive slots in time domain.

In one embodiment, the second radio resource block comprises a positive integer number of consecutive slots in time domain.

In one embodiment, the second radio resource block comprises a positive integer number of sub-frame(s) in time domain.

In one embodiment, the second radio resource block is configured by a higher layer signaling.

In one embodiment, the second radio resource block is configured by an RRC signaling.

In one embodiment, the second radio resource block is configured by a MAC CE signaling.

In one embodiment, the first radio resource block is a PUCCH.

In one embodiment, the first radio resource block comprises a PUSCH.

In one embodiment, the first radio resource block comprises a PUCCH.

In one subembodiment, the PUCCH is configured for transmission of a high-priority HARQ-ACK codebook.

In one subembodiment, the PUCCH is configured for transmission of a URLLC Service Type HARQ-ACK codebook.

In one subembodiment, the PUCCH is a slot-based PUCCH.

In one subembodiment, the PUCCH is a sub-slot-based PUCCH.

In one embodiment, the first radio resource block comprises a short PUSCH (sPUSCH).

In one embodiment, the first radio resource block comprises a Narrow Band PUSCH (NB-PUSCH).

In one embodiment, the second radio resource block is a PUSCH.

In one embodiment, the second radio resource block comprises a PUSCH.

In one subembodiment, the PUSCH is configured for a transmission of low-priority service data.

In one subembodiment, the PUSCH is configured for a transmission of eMBB Service Type service data.

In one subembodiment, the PUSCH is a slot-based PUSCH.

In one subembodiment, the PUSCH is a sub-slot-based PUSCH.

In one embodiment, the second radio resource block comprises a sPUSCH.

In one embodiment, the second radio resource block comprises an NB-PUSCH.

In one embodiment, the second radio resource block is resources configured for service data transmission.

In one embodiment, configuration information of the first radio resource block comprises one or more of time-domain resources being occupied, frequency-domain resources being occupied, code-domain resources being occupied, a modulation mode, a low Peak-to-Average Power Ratio (PAPR) sequence, a pseudo-random sequence, a cyclic shift, an Orthogonal Cover Code (OCC), an orthogonal sequence, a maximum code rate, a maximum payload size or a PUCCH format.

In one embodiment, the phrase that the first bit block and the second bit block respectively correspond to different types includes a meaning that: the first bit block is used for generating UCI, while the second bit block is used for generating a data channel.

In one embodiment, the phrase that the first bit block and the second bit block respectively correspond to different types includes a meaning that: a physical layer channel generated by the first bit block is a PUCCH, while a physical layer channel generated by the second bit block is a PUSCH.

In one embodiment, the phrase that the first bit block and the second bit block respectively correspond to different types includes a meaning that: a logical channel generated by the first bit block is a CCCH, while a logical channel generated by the second bit block is a DTCH.

In one embodiment, the phrase that the first bit block and the second bit block respectively correspond to different types includes a meaning that: the first bit block is used for URLLC services, while the second bit block is used for eMBB services.

In one embodiment, the phrase that the first bit block and the second bit block respectively correspond to different types includes a meaning that: the first bit block is used for eMBB services, while the second bit block is used for URLLC services.

In one embodiment, the phrase that the first bit block and the second bit block respectively correspond to different types includes a meaning that: the priority of the first bit block is different from the priority of the second bit block.

In one embodiment, the phrase that the first bit block and the second bit block respectively correspond to different types includes a meaning that: the priority of the first bit block is higher than the priority of the second bit block.

In one embodiment, the phrase that the first bit block and the second bit block respectively correspond to different types includes a meaning that: the first bit block comprises a URLLC Service Type control signaling, while the second bit block comprises eMBB Service Type user data.

In one embodiment, the phrase that the first bit block and the second bit block respectively correspond to different types includes a meaning that: the first bit block comprises a URLLC Service Type HARQ-ACK Codebook, while the second bit block comprises eMBB Service Type user service data.

In one embodiment, the phrase that the first bit block and the second bit block respectively correspond to different types includes a meaning that: the service type of the first bit block is different from the service type of the second bit block.

In one embodiment, the first bit block comprises service data/control signaling of URLLC Service Type.

In one embodiment, the second bit block comprises service data/control signaling of eMBB Service Type.

In one embodiment, the first bit block comprises UCI.

In one embodiment, the first bit block comprises high-priority UCI.

In one embodiment, the first bit block comprises a UCI for URLLC Service Type.

In one embodiment, the first bit block comprises a HARQ-ACK codebook.

In one embodiment, the first bit block comprises a high-priority HARQ-ACK codebook.

In one embodiment, the first bit block comprises a HARQ-ACK codebook for URLLC Service Type.

In one embodiment, the second bit block comprises low-priority service data.

In one embodiment, the second bit block comprises service data.

In one embodiment, the phrase of time-domain resources occupied by the first radio resource block and time-domain resources occupied by the second radio resource block being overlapping means that: there exists a given OFDM symbol, where time-domain resources occupied by the first radio resource block and time-domain resources occupied by the second radio resource block both comprise the given OFDM symbol.

In one embodiment, the phrase of time-domain resources occupied by the first radio resource block and time-domain resources occupied by the second radio resource block being overlapping means that: there exists a given multicarrier symbol, where time-domain resources occupied by the first radio resource block and time-domain resources occupied by the second radio resource block both comprise the given multicarrier symbol.

In one embodiment, the phrase of time-domain resources occupied by the first radio resource block and time-domain resources occupied by the second radio resource block being overlapping means that: time-domain resources occupied by the first radio resource block belong to time-domain resources occupied by the second radio resource block.

In one embodiment, the phrase of time-domain resources occupied by the first radio resource block and time-domain resources occupied by the second radio resource block being overlapping means that: time-domain resources occupied by the second radio resource block belong to time-domain resources occupied by the first radio resource block.

In one embodiment, the first signaling and the second signaling both comprise a first field; the first field comprised in the first signaling and the first field comprised in the second signaling respectively indicate a type corresponding to the first bit block and a type corresponding to the second bit block.

In one embodiment, a type corresponding to the first bit block is a priority indicated by the first field comprised in the first signaling.

In one embodiment, a type corresponding to the second bit block is a priority indicated by the first field comprised in the second signaling.

In one embodiment, the first field is a Priority Indicator field.

In one embodiment, only when a first condition set is fulfilled will a time gap between the second time and the first time be used by the first node to determine whether bits in the second bit block are used for generating the target signal.

In one subembodiment, the phrase that a first condition set is fulfilled comprises that all conditions in the first condition set are being fulfilled.

In one subembodiment, the first condition set comprises a positive integer number of condition(s).

In one subembodiment, the conditions in the first condition set include: a third value being no greater than a first threshold; a number of bits comprised in the first bit block and a number of bits comprised in the second bit block (size of the second bit block) being used together to determine the third value; and the first threshold being related to a number of time-frequency resource elements comprised in the second radio resource block.

In one subembodiment, the conditions in the first condition set include: a third value being no greater than a first threshold; a ratio of a number of bits comprised in the first bit block to a number of bits comprised in the second bit block being used to determine the third value; and the first threshold being related to a number of time-frequency resource elements comprised in the second radio resource block.

In one subembodiment, the time-frequency resource element is an RE.

In one subembodiment, when any condition in the first condition set is not being fulfilled, the first node determines that bits in the second bit block are not used for generating the target signal.

In one subembodiment, when any condition in the first condition set is not being fulfilled, the first node determines that the target radio resource block is the first radio resource block.

In one subembodiment, the first condition set comprises a Timeline condition, for the specific meaning of the Timeline condition, refer to 3GPP TS38.213, Section 9.2.5.

In one subembodiment, a condition in the first condition set is a Timeline condition related to at least one of $$T_{proc,1}^{mux}, T_{proc,2}^{mux}, T_{proc,release}^{mux} \text{ or } T_{proc,CSI}^{mux};$$

for the specific meaning of the Timeline condition, refer to 3GPP TS38.213, Section 9.2.5; specific meanings of the $$T_{proc,1}^{mux}, \text{ the } T_{proc,2}^{mux}, \text{ the } T_{proc,release}^{mux} \text{ and the } T_{proc,CSI}^{mux}$$

can also be found in 3GPP TS38.213, Section 9.2.5.

In one subembodiment, the first condition set comprises a condition indicating that the second radio resource block can support transmitting of the first bit block.

In one subembodiment, the first condition set comprises a Timeline condition, for the specific meaning of the Timeline condition, refer to 3GPP TS38.213, Section 9.2.5; the Timeline condition in the first condition set is related to an earliest multicarrier symbol in a first time-domain resource set, the first time-domain resource set comprising time-domain resources occupied by the first radio resource block and time-domain resources occupied by the second radio resource block.

In one embodiment, whether a time gap between the second time and the first time is greater than a threshold is used to determine whether bits in the second bit block are used for generating the target signal.

In one embodiment, the first radio resource block and the second radio resource block are overlapping in frequency domain.

In one embodiment, the first radio resource block and the second radio resource block are non-overlapping in frequency domain.

In one embodiment, a first time gap is equal to a time gap between the second time and the first time; when a ratio of the first time gap to the time-domain resources occupied by the first radio resource block is no greater than a first proportion, bits in the second bit block are used for generating the target signal, the target radio resource block being the second radio resource block; when a ratio of the first time gap to the time-domain resources occupied by the first radio resource block is greater than a first proportion, bits in the second bit block are not used for generating the target signal, the target radio resource block being the first radio resource block.

In one subembodiment, the first time gap is equal to a duration of a positive integer number of consecutive multi-carrier symbols, where time-domain resources occupied by the first radio resource block equals the duration of the positive integer number of consecutive multicarrier symbols.

In one subembodiment, the first proportion is configured by higher layer.

In one subembodiment, the first proportion is a dynamically indicated value.

Embodiment 2

Figure 2:
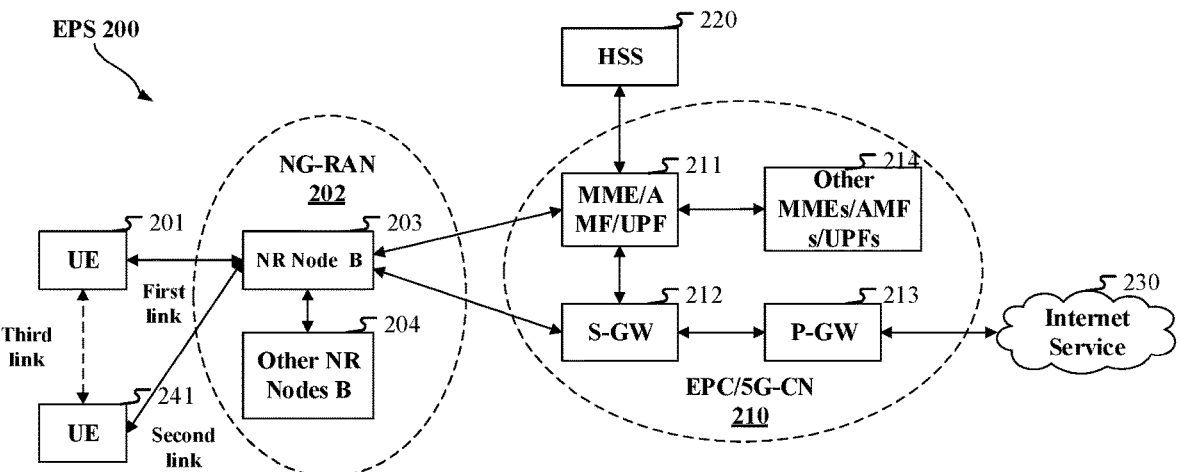
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/inter-faces are not shown. As shown in FIG. 2, the EPS 200 provides packet switching services. Those skilled in the art will find it easy to understand that various concepts pre-sented throughout the present application can be extended to networks providing circuit switching services or other cel-lular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Trans-mitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communica-tions, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communi-cation equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appro-priate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW)

212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to opera-tors, specifically including Internet, Intranet, IP Multimedia Subsystem (IMS) and Packet Switching Streaming (PSS) services.

In one embodiment, the UE 201 corresponds to the first node in the present application.

In one embodiment, the UE 241 corresponds to the second node in the present application.

In one embodiment, the gNB 203 corresponds to the second node in the present application.

In one embodiment, the UE 241 corresponds to the first node in the present application.

In one embodiment, the UE 201 corresponds to the second node in the present application.

Embodiment 3

Figure 3:
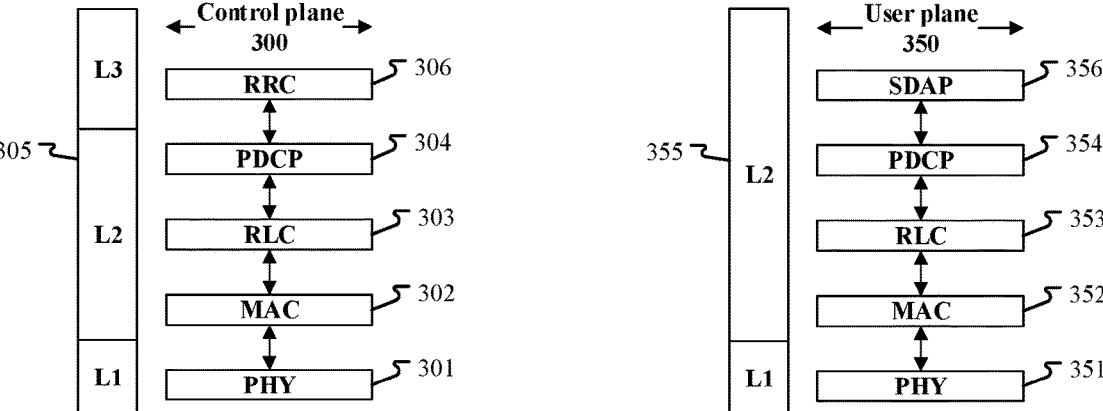
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 pro-vides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also respon-sible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer.

In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first bit block in the present application is generated by the RRC sublayer 306.

In one embodiment, the first bit block in the present application is generated by the MAC sublayer 302.

In one embodiment, the first bit block in the present application is generated by the MAC sublayer 352.

In one embodiment, the first bit block in the present application is generated by the PHY 301.

In one embodiment, the first bit block in the present application is generated by the PHY 351.

In one embodiment, the second bit block in the present application is generated by the RRC sublayer 306.

In one embodiment, the second bit block in the present application is generated by the MAC sublayer 302.

In one embodiment, the second bit block in the present application is generated by the MAC sublayer 352.

In one embodiment, the second bit block in the present application is generated by the PHY 301.

In one embodiment, the second bit block in the present application is generated by the PHY 351.

In one embodiment, the first information in the present application is generated by the RRC sublayer 306.

In one embodiment, the first information in the present application is generated by the MAC sublayer 302.

In one embodiment, the first information in the present application is generated by the MAC sublayer 352.

In one embodiment, the first information in the present application is generated by the PHY 301.

In one embodiment, the first information in the present application is generated by the PHY 351.

In one embodiment, the third bit block in the present application is generated by the RRC sublayer 356.

In one embodiment, the third bit block in the present application is generated by the MAC sublayer 302.

In one embodiment, the third bit block in the present application is generated by the MAC sublayer 352.

In one embodiment, the third bit block in the present application is generated by the PHY 301.

In one embodiment, the third bit block in the present application is generated by the PHY 351.

In one embodiment, the first signaling in the present application is generated by the PHY 301.

In one embodiment, the first signaling in the present application is generated by the PHY 351.

In one embodiment, the second signaling in the present application is generated by the PHY 301.

In one embodiment, the second signaling in the present application is generated by the PHY 351.

In one embodiment, the first bit block in the present application is generated by the RRC sublayer 306.

In one embodiment, the first bit block in the present application is generated by the MAC sublayer 302.

In one embodiment, the first bit block in the present application is generated by the MAC sublayer 352.

In one embodiment, the first bit block in the present application is generated by the PHY 301.

In one embodiment, the first bit block in the present application is generated by the PHY 351.

In one embodiment, the second bit block in the present application is generated by the RRC sublayer 356.

In one embodiment, the second bit block in the present application is generated by the MAC sublayer 302.

In one embodiment, the second bit block in the present application is generated by the MAC sublayer 352.

In one embodiment, the second bit block in the present application is generated by the PHY 301.

In one embodiment, the second bit block in the present application is generated by the PHY 351.

In one embodiment, the third bit block in the present application is generated by the RRC sublayer 356.

In one embodiment, the third bit block in the present application is generated by the MAC sublayer 302.

In one embodiment, the third bit block in the present application is generated by the MAC sublayer 352.

In one embodiment, the third bit block in the present application is generated by the PHY 301.

In one embodiment, the third bit block in the present application is generated by the PHY 351.

In one embodiment, the first signaling in the present application is generated by the PHY 301.

In one embodiment, the first signaling in the present application is generated by the PHY 351.

In one embodiment, the second signaling in the present application is generated by the PHY 301.

In one embodiment, the second signaling in the present application is generated by the PHY 351.

Embodiment 4

Figure 4:
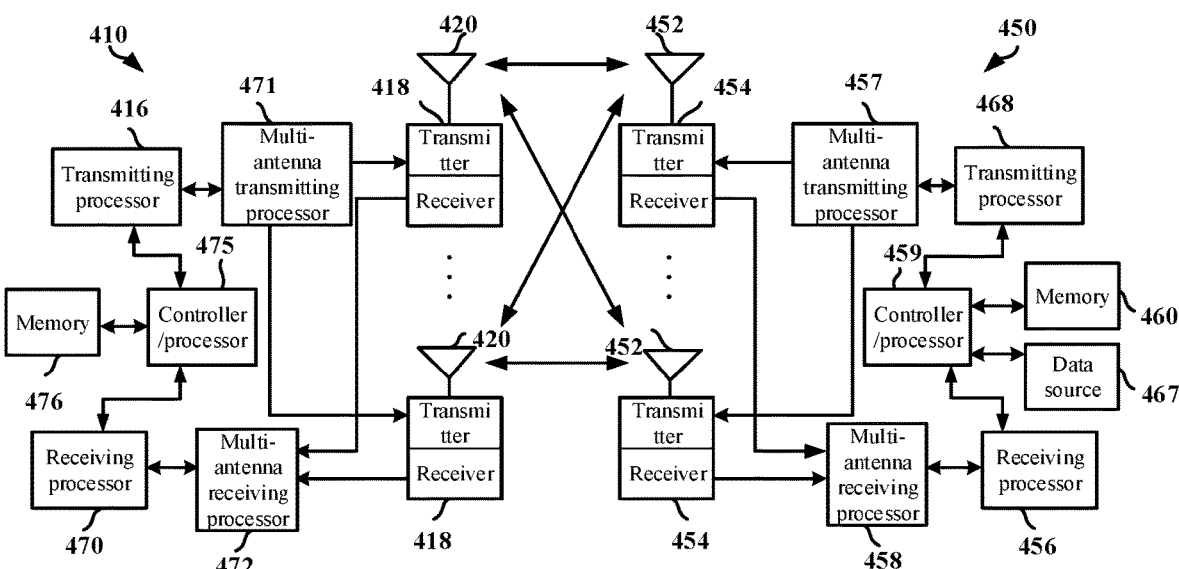
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the second communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE)

450. The higher-layer packet coming from the controller/processor 475 may be provided to the core network.

In one embodiment, the first node in the present application comprises the second communication device 450, and the second node in the present application comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one embodiment, the second communication node 450 comprises at least one processor and at least one memory, the at least one memory comprises computer program codes; the at least one memory and the computer program codes are configured to be used in collaboration with the at least one processor. The second communication device 450 at least: receives the first information in the present application; and transmits the first signal in the present application in the first time-frequency resource block in the present application, the first signal carrying the second bit block in the present application; herein, the first bit block in the present application is used for generating the second bit block; the first bit block comprises the first bit sub-block in the present application and the second bit sub-block in the present application, where a priority corresponding to the first bit sub-block is higher than a priority corresponding to the second bit sub-block; a number of Resource Elements (REs) in the first time-frequency resource block used for transmitting the second bit block is no greater than the first value in the present application, a number of bits comprised in the first bit sub-block being used to determine the first value; the number of bits comprised in the first bit sub-block and the first information are used together to determine the second value in the present application; a number of REs in the first time-frequency resource block used for transmitting bits associated with the first bit sub-block comprised in the second bit block is equal to a minimum value between the first value and the second value.

In one subembodiment, the second communication device 450 corresponds to the first node in the present application.

In one embodiment, the second communication node 450 comprises a memory that stores a computer readable instruction program, the computer readable instruction program generates actions when executed by at least one processor, which include: receiving the first information in the present application; and transmitting the first signal in the present application in the first time-frequency resource block in the present application, the first signal carrying the second bit block in the present application; herein, the first bit block in the present application is used for generating the second bit block; the first bit block in the present application is used for generating the second bit block; the first bit block comprises the first bit sub-block in the present application and the second bit sub-block in the present application, where a priority corresponding to the first bit sub-block is higher than a priority corresponding to the second bit sub-block; a number of Resource Elements (REs) in the first time-frequency resource block used for transmitting the second bit block is no greater than the first value in the present application, a number of bits comprised in the first bit sub-block being used to determine the first value; the number of bits comprised in the first bit sub-block and the first information are used together to determine the second value in the present application; a number of REs in the first time-frequency resource block used for transmitting bits associated with the first bit sub-block comprised in the second bit block is equal to a minimum value between the first value and the second value.

In one subembodiment, the second communication device 450 corresponds to the first node in the present application.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits the first information in the present application; and receives the first signal in the present application in the first time-frequency resource block in the present application, the first signal carrying the second bit block in the present application; herein, the first bit block in the present application is used for generating the second bit block; the first bit block comprises the first bit sub-block in the present application and the second bit sub-block in the present application, where a priority corresponding to the first bit sub-block is higher than a priority corresponding to the second bit sub-block; a number of Resource Elements (REs) in the first time-frequency resource block used for transmitting the second bit block is no greater than the first value in the present application, a number of bits comprised in the first bit sub-block being used to determine the first value; the number of bits comprised in the first bit sub-block and the first information are used together to determine the second value in the present application; a number of REs in the first time-frequency resource block used for transmitting bits associated with the first bit sub-block comprised in the second bit block is equal to a minimum value between the first value and the second value.

In one subembodiment, the first communication device 410 corresponds to the second node in the present application.

In one embodiment, the first communication device 410 comprises a memory that stores a computer readable instruction program, the computer readable instruction program generates actions when executed by at least one processor, which include: transmitting the first information in the present application; and receiving the first signal in the present application in the first time-frequency resource block in the present application, the first signal carrying the second bit block in the present application; herein, the first bit block in the present application is used for generating the second bit block; the first bit block comprises the first bit sub-block in the present application and the second bit sub-block in the present application, where a priority corresponding to the first bit sub-block is higher than a priority corresponding to the second bit sub-block; a number of Resource Elements (REs) in the first time-frequency resource block used for transmitting the second bit block is no greater than the first value in the present application, a number of bits comprised in the first bit sub-block being used to determine the first value; the number of bits comprised in the first bit sub-block and the first information are used together to determine the second value in the present application; a number of REs in the first time-frequency resource block used for transmitting bits associated with the first bit sub-block comprised in the second bit block is equal to a minimum value between the first value and the second value.

In one subembodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used for receiving the first information in the present application.

In one embodiment, at least one of the antenna 420, the transmitter 418, the multi-antenna transmitting processor 471, the transmitting processor 416, the controller/processor 475 or the memory 476 is used for transmitting the first information in the present application.

In one embodiment, at least one of the antenna 452, the receiver 454, the multi-antenna receiving processor 458, the receiving processor 456, the controller/processor 459, the memory 460, or the data source 467 is used for receiving the first signaling in the present application.

In one embodiment, at least one of the antenna 420, the transmitter 418, the multi-antenna transmitting processor 471, the transmitting processor 416, the controller/processor 475 or the memory 476 is used for transmitting the first signaling in the present application.

In one embodiment, at least one of the antenna 452, the receiver 454, the multi-antenna receiving processor 458, the receiving processor 456, the controller/processor 459, the memory 460, or the data source 467 is used for receiving the second signaling in the present application.

In one embodiment, at least one of the antenna 420, the transmitter 418, the multi-antenna transmitting processor 471, the transmitting processor 416, the controller/processor 475 or the memory 476 is used for transmitting the second signaling in the present application.

In one embodiment, at least one of the antenna 452, the transmitter 454, the multi-antenna transmitting processor 458, the transmitting processor 468, the controller/processor 459, the memory 460, or the data source 467 is used for transmitting the first signal in the present application in the first time-frequency resource block in the present application.

In one embodiment, at least one of the antenna 420, the receiver 418, the multi-antenna receiving processor 472, the receiving processor 470, the controller/processor 475 or the memory 476 is used for receiving the first signal in the present application in the first time-frequency resource block in the present application.

In one embodiment, the second communication node 450 comprises at least one processor and at least one memory, the at least one memory comprises computer program codes; the at least one memory and the computer program codes are configured to be used in collaboration with the at least one processor. The second communication device 450 at least: receives the first signaling in the present application and the second signaling in the present application, the first signaling and the second signaling being respectively used to determine the first radio resource block in the present application and the second radio resource block in the present application; and transmits the target signal in the present application in the target radio resource block in the present application; herein, the first radio resource block is reserved to be used for transmitting the first bit block in the present application, while the second radio resource block is reserved to be used for transmitting the second bit block in the present application, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is the first time in the present application, and a number of bits comprised in the first bit block is used to determine the second time in the present application; the second time is no earlier than the first time in time domain; a time gap between the second time and the first time is used to determine whether bits in the second bit block are used for generating the target signal; the first bit block and the second bit block respectively correspond to different types.

In one subembodiment, the second communication device 450 corresponds to the first node in the present application.

In one embodiment, the second communication node 450 comprises a memory that stores a computer readable instruction program, the computer readable instruction program generates actions when executed by at least one processor, which include: receiving the first signaling in the present application and the second signaling in the present application, the first signaling and the second signaling being respectively used to determine the first radio resource block in the present application and the second radio resource block in the present application; and transmitting the target signal in the present application in the target radio resource block in the present application; herein, the first radio resource block is reserved to be used for transmitting the first bit block in the present application, while the second radio resource block is reserved to be used for transmitting the second bit block in the present application, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is the first time in the present application, and a number of bits comprised in the first bit block is used to determine the second time in the present application; the second time is no earlier than the first time in time domain; a time gap between the second time and the first time is used to determine whether bits in the second bit block are used for generating the target signal; the first bit block and the second bit block respectively correspond to different types.

In one subembodiment, the second communication device 450 corresponds to the first node in the present application.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits the first signaling in the present application and the second signaling in the present application, the first signaling and the second signaling being respectively used to determine the first radio resource block in the present application and the second radio resource block in the present application; and receives the target signal in the present application in the target radio resource block in the present application; herein, the first radio resource block is reserved to be used for transmitting the first bit block in the present application, while the second radio resource block is reserved to be used for transmitting the second bit block in the present application, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is the first time in the present application, and a number of bits comprised in the first bit block is used to determine the second time in the present application; the second time is no earlier than the first time in time domain; a time gap between the second time and the first time is used to determine whether bits in the second bit block are used for generating the target signal; the first bit block and the second bit block respectively correspond to different types.

In one subembodiment, the first communication device 410 corresponds to the second node in the present application.

In one embodiment, the first communication device 410 comprises a memory that stores a computer readable instruction program, the computer readable instruction program generates actions when executed by at least one processor, which include: transmitting the first signaling in the present application and the second signaling in the present application, the first signaling and the second signaling being respectively used to determine the first radio resource block in the present application and the second radio resource block in the present application; and receiving the target signal in the present application in the target radio resource block in the present application; herein, the first radio resource block is reserved to be used for transmitting the first bit block in the present application, while the second radio resource block is reserved to be used for transmitting the second bit block in the present application, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is the first time in the present application, and a number of bits comprised in the first bit block is used to determine the second time in the present application; the second time is no earlier than the first time in time domain; a time gap between the second time and the first time is used to determine whether bits in the second bit block are used for generating the target signal; the first bit block and the second bit block respectively correspond to different types.

In one subembodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used for receiving the first signaling in the present application.

In one embodiment, at least one of the antenna 420, the transmitter 418, the multi-antenna transmitting processor 471, the transmitting processor 416, the controller/processor 475 or the memory 476 is used for transmitting the first signaling in the present application.

In one embodiment, at least one of the antenna 452, the receiver 454, the multi-antenna receiving processor 458, the receiving processor 456, the controller/processor 459, the memory 460, or the data source 467 is used for receiving the second signaling in the present application.

In one embodiment, at least one of the antenna 420, the transmitter 418, the multi-antenna transmitting processor 471, the transmitting processor 416, the controller/processor 475 or the memory 476 is used for transmitting the second signaling in the present application.

In one embodiment, at least one of the antenna 452, the receiver 454, the multi-antenna receiving processor 458, the receiving processor 456, the controller/processor 459, the memory 460, or the data source 467 is used for receiving the first signal in the present application.

In one embodiment, at least one of the antenna 420, the transmitter 418, the multi-antenna transmitting processor 471, the transmitting processor 416, the controller/processor 475 or the memory 476 is used for transmitting the first signal in the present application.

In one embodiment, at least one of the antenna 452, the transmitter 454, the multi-antenna transmitting processor 458, the transmitting processor 468, the controller/processor 459, the memory 460, or the data source 467 is used for transmitting the target signal in the present application in the target radio resource block in the present application.

In one embodiment, at least one of the antenna 420, the receiver 418, the multi-antenna receiving processor 472, the receiving processor 470, the controller/processor 475 or the memory 476 is used for receiving the target signal in the present application in the target radio resource block in the present application.

Embodiment 5A

Figure 5A:
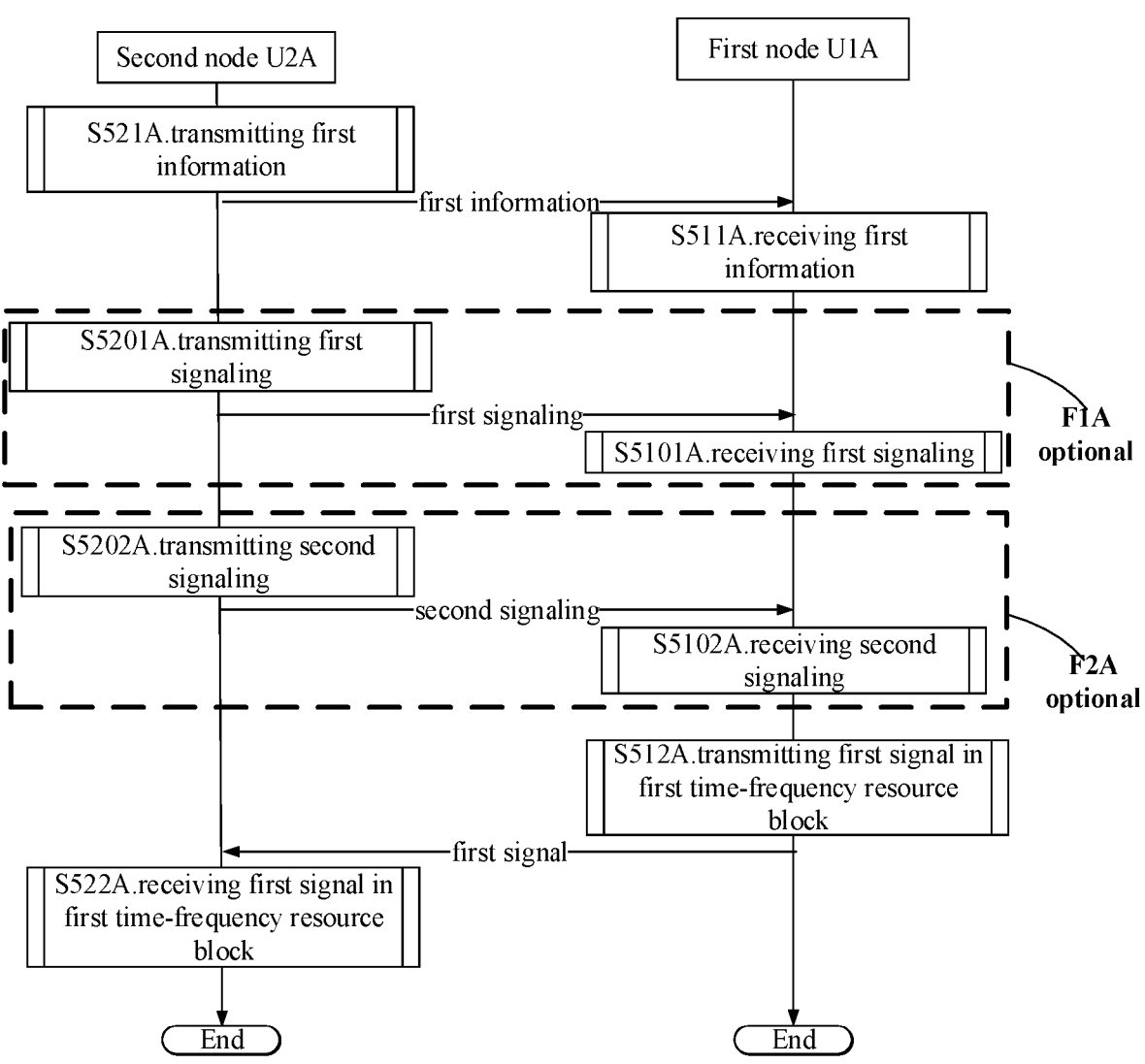
FIG. 5A illustrates a flowchart of signal transmission according to one embodiment of the present application.

Embodiment 5A illustrates a flowchart of radio signal transmission according to one embodiment of the present application, as shown in FIG. 5A. In FIG. 5A, a first node U1A and a second node U2A are in communications via an air interface. In FIG. 5A, the dotted-line boxes F1A and F2A are optional; the sequential order between the box F1A and the box F2A does not imply any specific temporal order.

The first node U1A receives first information in step S511A; and receives a first signaling in step S5101A; receives a second signaling in step S5102A; and transmits a first signal in a first time-frequency resource block in step S512A.

The second node U2A transmits first information in step S521A; transmits a first signaling in step S5201A; transmits a second signaling in step S5202A; and receives a first signal in a first time-frequency resource block in step S522A.

In Embodiment 5A, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value; the first value is unrelated to the first information; the first value is no greater than a first candidate value and no less than a second candidate value; a first parameter is used to determine the first candidate value, while a second parameter is used to determine the second candidate value; the first parameter and the second parameter respectively correspond to a first priority and a second priority; the priority corresponding to the first bit sub-block is the first priority, and the priority corresponding to the second bit sub-block is the second priority; the first signaling indicates a first radio resource block, while the second signaling indicates a second radio resource block; at least one of the first radio resource block or the second radio resource block is overlapping with the first time-frequency resource block in time domain; the first signal carries a third bit block; the first time-frequency resource block is a time-frequency resource block configured for the third bit block; the third bit block is the first-type bit block between a first-type bit block and a second-type bit block.

In one subembodiment of Embodiment 5A, a target parameter is used to determine the first value; the target parameter is the first parameter or the second parameter, the first parameter and the second parameter respectively corresponding to the first priority and the second priority; the priority corresponding to the first bit sub-block is the first priority, and the priority corresponding to the second bit sub-block is the second priority; the number of bits comprised in the first bit sub-block and a number of bits comprised in the second bit sub-block are used together to determine the target parameter.

In one subembodiment of Embodiment 5A, when a second value is greater than the second candidate value, the first value is the first candidate value; when the second value is no greater than the second candidate value, the first value is the second candidate value.

In one embodiment, the first node U1A is the first node in the present application.

In one embodiment, the second node U2A is the second node in the present application.

In one embodiment, the first node U1A is a UE.

In one embodiment, the second node U2A is a base station.

In one embodiment, the second node U2A is a UE.

In one embodiment, an air interface between the second node U2A and the first node U1A is a Uu interface.

In one embodiment, an air interface between the second node U2A and the first node U1A includes a cellular link.

In one embodiment, an air interface between the second node U2A and the first node U1A includes a radio interface between a base station and a UE.

In one embodiment, the first priority and the second priority are different priorities.

In one embodiment, the first priority is High Priority, and the second priority is Low Priority.

In one embodiment, the first priority is a priority corresponding to URLLC Service Type, while the second priority is a low priority corresponding to eMBB Service Type.

In one embodiment, the first priority is Low Priority, and the second priority is High Priority.

In one embodiment, the second priority is a priority corresponding to URLLC Service Type, while the first priority is a low priority corresponding to eMBB Service Type.

In one embodiment, the first priority and the second priority are respectively priorities corresponding to different communication modes.

In one embodiment, the first priority and the second priority are respectively priorities corresponding to different service types.

In one embodiment, the first radio resource block and the first time-frequency resource block are overlapping in time domain.

In one embodiment, the second radio resource block and the first time-frequency resource block are overlapping in time domain.

In one embodiment, the first radio resource block and the second radio resource block are both overlapping with the first time-frequency resource block in time domain.

In one embodiment, the first radio resource block and the second radio resource block are overlapping in time domain.

In one embodiment, the first signaling is a last one of signalings in a first signaling set, with each signaling in the first signaling set indicating the first priority.

In one embodiment, the second signaling is a last one of signalings in a second signaling set, with each signaling in the second signaling set indicating the second priority.

In one embodiment, the first radio resource block is a radio resource block configured for the first bit sub-block.

In one embodiment, the second radio resource block is a radio resource block configured for the second bit sub-block.

In one embodiment, the first radio resource block comprises a Physical Uplink Control CHannel (PUCCH).

In one subembodiment, the PUCCH is configured for a high-priority HARQ-ACK codebook.

In one subembodiment, the PUCCH is configured for a URLLC Service Type HARQ-ACK codebook.

In one subembodiment, the PUCCH is a slot-based PUCCH.

In one subembodiment, the PUCCH is a sub-slot-based PUCCH.

In one embodiment, the second radio resource block comprises a PUCCH.

In one subembodiment, the PUCCH is configured for a low-priority HARQ-ACK codebook.

In one subembodiment, the PUCCH is configured for an eMBB Service Type HARQ-ACK codebook.

In one subembodiment, the PUCCH is a slot-based PUCCH.

In one subembodiment, the PUCCH is a sub-slot-based PUCCH.

In one embodiment, a first signaling set comprises a positive integer number of signaling(s), and the first bit sub-block comprises a positive integer number of HARQ-ACK bit(s) corresponding to the positive integer number of signaling(s) in the first signaling set, where each of the positive integer number of signaling(s) in the first signaling set indicates the first priority.

In one subembodiment, each of the positive integer number of signaling(s) in the first signaling set is a DCI.

In one subembodiment, each of the positive integer number of signaling(s) in the first signaling set comprises the second signaling.

In one subembodiment, each of the positive integer number of signaling(s) in the first signaling set comprises a field, and the field in each of the positive integer number of signaling(s) in the first signaling set indicates the first priority, the field being a Priority Indicator field.

In one embodiment, a second signaling set comprises a positive integer number of signaling(s), and the second bit sub-block comprises a positive integer number of HARQ-ACK bit(s) corresponding to the positive integer number of signaling(s) in the second signaling set, where each of the positive integer number of signaling(s) in the second signaling set indicates the second priority.

In one subembodiment, each of the positive integer number of signaling(s) in the second signaling set is a DCI.

In one subembodiment, each of the positive integer number of signaling(s) in the second signaling set comprises the second signaling.

In one subembodiment, each of the positive integer number of signaling(s) in the second signaling set comprises a field, and the field in each of the positive integer number of signaling(s) in the second signaling set indicates the second priority, the field being a Priority Indicator field.

In one embodiment, the third bit block comprises a Transport Block (TB).

In one embodiment, the third bit block comprises a Code Block Group (CBG).

In one embodiment, the third bit block comprises a positive integer number of Code Block(s) (CB(s)).

In one embodiment, the third bit block comprises a positive integer number of bit(s).

In one embodiment, a control signaling scheduling the third bit block indicates that the third bit block is the first-type bit block between the first-type bit block and the second-type bit block.

In one subembodiment, the control signaling scheduling the third bit block is Downlink Control Information (DCI).

In one subembodiment, a field in the control signaling scheduling the third bit block indicates the first-type bit block between the first-type bit block and the second-type bit block, the field being a Priority Indicator field.

In one embodiment, a third signaling comprises scheduling information of the third bit block; the scheduling information of the third bit block comprises: at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), a transmission antenna port, or a corresponding Transmission Configuration Indicator (TCI) state.

In one embodiment, the first time-frequency resource block is scheduled to be used for transmitting the third bit block.

In one embodiment, the third bit block is a bit block comprising service data.

In one embodiment, the first-type bit block is a bit block comprising high-priority data, while the second-type bit block is a bit block comprising low-priority data.

In one embodiment, the first-type bit block is a bit block comprising low-priority data, while the second-type bit block is a bit block comprising high-priority data.

In one embodiment, the phrase that the first-type bit block is a bit block comprising low-priority data comprises that the first-type bit block is a bit block comprising service data, a control signaling scheduling the first-type bit block indicating Low Priority.

In one subembodiment, the control signaling scheduling the first-type bit block is DCI.

In one subembodiment, a field in the control signaling scheduling the first-type bit block indicates Low Priority, the field being a Priority Indicator field in DCI.

In one embodiment, the phrase that the first-type bit block is a bit block comprising high-priority data comprises that the first-type bit block is a bit block comprising service data, a control signaling scheduling the first-type bit block indicating High Priority.

In one subembodiment, the control signaling scheduling the first-type bit block is DCI.

In one subembodiment, a field in the control signaling scheduling the first-type bit block indicates High Priority, the field being a Priority Indicator field in DCI.

In one embodiment, the phrase that the second-type bit block is a bit block comprising low-priority data comprises that the second-type bit block is a bit block comprising service data, a control signaling scheduling the second-type bit block indicating Low Priority.

In one subembodiment, the control signaling scheduling the second-type bit block is DCI.

In one subembodiment, a field in the control signaling scheduling the second-type bit block indicates Low Priority, the field being a Priority Indicator field in DCI.

In one embodiment, the phrase that the second-type bit block is a bit block comprising high-priority data comprises that the second-type bit block is a bit block comprising service data, a control signaling scheduling the second-type bit block indicating High Priority.

In one subembodiment, the control signaling scheduling the second-type bit block is DCI.

In one subembodiment, a field in the control signaling scheduling the second-type bit block indicates High Priority, the field being a Priority Indicator field in DCI.

In one embodiment, the first-type bit block is a bit block comprising URLLC Service Type data, while the second-type bit block is a bit block comprising eMBB Service Type data.

In one embodiment, the first-type bit block is a bit block comprising eMBB Service Type data, while the second-type bit block is a bit block comprising URLLC Service Type data.

In one embodiment, the first-type bit block is a bit block comprising low-priority data, while the second-type bit block is a bit block comprising high-priority data, the first time-frequency resource block is a time-frequency resource block configured for the third bit block, the third bit block being the first-type bit block; only when the second value is no greater than the first candidate value will the first signal be transmitted by the first node in the first time-frequency resource block.

In one subembodiment, when the first signal is transmitted by the first node in the present application in the first time-frequency resource block, the first signal carries the third bit block.

In one subembodiment, when the second value is greater than the first candidate value, the first signal is not transmitted by the first node in the present application in the first time-frequency resource block.

In one subembodiment, when the second value is greater than the first candidate value, the first signal is not transmitted by the first node in the present application in the first time-frequency resource block, while the first bit sub-block is transmitted by the first node in the present application in the first radio resource block.

In one embodiment, the second-type bit block is a bit block comprising low-priority data, while the first-type bit block is a bit block comprising high-priority data; the first time-frequency resource block is a time-frequency resource block configured for the third bit block, the third bit block being the first-type bit block; the first signal is transmitted by the first node in the first time-frequency resource block, the first signal carrying the third bit block.

In one embodiment, a number of bits comprised in the first bit sub-block is mapped into a value range of multiple value ranges, with the second value belonging to the value range.

In one embodiment, the steps marked by the box F1A in FIG. 5A exist.

In one embodiment, the steps marked by the box F1A in FIG. 5A do not exist.

In one embodiment, the steps marked by the box F2A in FIG. 5A exist.

In one embodiment, the steps marked by the box F2A in FIG. 5A do not exist.

Embodiment 5B

Embodiment 5B illustrates a flowchart of radio signal transmission according to one embodiment of the present application, as shown in FIG. 5B. In FIG. 5B, a first node U1B and a second node U2B are in communications via an air interface. In FIG. 5B, the dotted-line box F1B is optional. Particularly, the sequential order of two pairs of transmitting and receiving steps, namely, {S521B, S511B} and {S522B, S512B} in FIG. 5B does not imply a specific temporal order; besides, the sequentially order of two pairs of transmitting and receiving steps, namely, {S521B, S511B} and {S201B, S5101B} in FIG. 5B does not imply a specific temporal order.

The first node U1B receives a second signaling in step S511B; and receives a first signaling in step S512B; and receives a first signal in step S5101B; transmits a target signal in a target radio resource block in step 513B.

The second node U2B transmits a second signaling in step S521B; and transmits a first signaling in step S522B; transmits a first signal in step S5201B; and receives a target signal in a target radio resource block in step 523B.

In Embodiment 5B, the first signaling and the second signaling are respectively used to determine a first radio resource block and a second radio resource block; and the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block is used to determine a second time; the second time is no earlier than the first time in time domain; a time gap between the second time and the first time is used to determine whether bits in the second bit block are used for generating the target signal; the first bit block and the second bit block respectively correspond to different types; when a time gap between the second time and the first time is no greater than a first threshold, bits in the second bit block are used for generating the target signal, the target radio resource block being the second radio resource block; when a time gap between the second time and the first time is greater than the first threshold, bits in the second bit block are not used for generating the target signal, the target radio resource block being the first radio resource block; when bits comprised in the second bit block are used for generating the target signal, the second time is an end time of time-domain resources occupied by a modulation symbol generated by the first bit block; the second time is before an end time of the second radio resource block in time domain; the first signal carries a third bit block, the first signaling comprising scheduling information of the third bit block, the first bit block comprising information indicating whether the third bit block is correctly received; when bits comprised in the second bit block are used for generating the target signal, time-domain resources before those occupied by a reference signal which is earliest in time domain in the target radio resource block are used for transmitting bits associated with the first bit block.

In one subembodiment of Embodiment 5B, the second time is after the first time in time domain.

In one subembodiment of Embodiment 5B, the first threshold is greater than 0.

In one embodiment, the first node U1B is the first node in the present application.

In one embodiment, the second node U2B is the second node in the present application.

In one embodiment, the first node U1B is a UE.

In one embodiment, the second node U2B is a base station.

In one embodiment, the second node U2B is a UE.

In one embodiment, an air interface between the second node U2B and the first node U1B is a Uu interface.

In one embodiment, an air interface between the second node U2B and the first node U1B includes a cellular link.

In one embodiment, an air interface between the second node U2B and the first node U1B is a PC5 interface.

In one embodiment, an air interface between the second node U2B and the first node U1B includes a sidelink.

In one embodiment, an air interface between the second node U2B and the first node U1B includes a radio interface between a base station and a UE.

In one embodiment, the first signal is a radio signal.

In one embodiment, the first signal is a baseband signal.

In one embodiment, the first signal is a radio frequency signal.

In one embodiment, the second time is after the first time in time domain, or, the second time and the first time are the same time.

In one embodiment, the first time is an end time of a last multicarrier symbol comprised in the first radio resource block in time domain.

In one embodiment, when bits comprised in the second bit block are used for generating the target signal, the second time is an end time of a last multicarrier symbol occupied by a modulation symbol generated by the first bit block.

In one embodiment, time-domain resources occupied by the second radio resource block include the second time.

In one embodiment, the second time is before an end time of the second radio resource block in time domain, and the second time is after a start time of the second radio resource block in time domain.

In one embodiment, the second time is an end time of a multicarrier symbol comprised in the second radio resource block in time domain.

In one embodiment, a modulation symbol generated by the first bit block is a symbol output by bits generated by all or partial bits in the first bit block sequentially through some or all of CRC Insertion, Segmentation, Code Block (CB)-level CRC Insertion, Channel Coding, Rate Matching, Concatenation, Scrambling, Modulation, Layer Mapping, and Precoding.

In one embodiment, a modulation symbol generated by the first bit block is a symbol output by all or partial bits in the first bit block sequentially through some or all of CRC Insertion, Segmentation, Code Block (CB)-level CRC Insertion, Channel Coding, Rate Matching, Concatenation, Scrambling, Modulation, Layer Mapping, and Precoding.

In one embodiment, the phrase of an end time of time-domain resources occupied by a modulation symbol generated by the first bit block comprises an end time of a last multicarrier symbol comprised in time-domain resources occupied by a modulation symbol generated by the first bit block.

In one embodiment, the scheduling information comprises one or more of indication information of time-domain resources being occupied, indication information of frequency-domain resources being occupied, an MCS, configuration information of Demodulation Reference Signals (DMRS), a HARQ process ID, a Redundancy Version (RV), a New Data Indicator (NDI) or a Priority.

In one embodiment, the first bit block comprises a HARQ-ACK codebook, the HARQ-ACK codebook comprising a positive integer number of HARQ-ACK bit(s) indicating whether the third bit block is correctly received.

In one embodiment, the second signaling comprises scheduling information of the second bit block.

In one embodiment, the first node receives a second signal; the second signal carries a fourth bit block, the second signaling comprising scheduling information of the fourth bit block, and the second bit block comprising information indicating whether the fourth bit block is correctly received.

In one subembodiment, the second bit block comprises a positive integer number of HARQ-ACK bit(s) indicating whether the fourth bit block is correctly received.

In one embodiment, the phrase of bits associated with the first bit block comprises all bits in the first bit block.

In one embodiment, the phrase of bits associated with the first bit block comprises partial bits in the first bit block.

In one embodiment, the phrase of bits associated with the first bit block comprises bits generated by the first bit block.

In one embodiment, the phrase of bits associated with the first bit block comprises bits generated by the first bit block through bundling operation.

In one embodiment, the phrase of bits associated with the first bit block comprises bits generated by the first bit block through Logical AND/Logical OR/Logical Xor operation.

In one embodiment, the reference signal which is earliest in time domain is used for channel detection.

In one embodiment, the reference signal which is earliest in time domain is a DMRS.

In one embodiment, the reference signal which is earliest in time domain is a UE-specific reference signal.

In one embodiment, the time-domain resources occupied by the reference signal which is earliest in time domain in the target radio resource block comprise a multicarrier symbol.

In one embodiment, the time-domain resources before the time-domain resources occupied by the reference signal which is earliest in time domain in the target radio resource block comprise a multicarrier symbol; the multicarrier symbol is a multicarrier symbol before multicarrier symbol(s) occupied by the reference signal which is earliest in time domain in the target radio resource block.

In one subembodiment, the multicarrier symbol is an OFDM symbol.

In one subembodiment, the multicarrier symbol is a DFT-s-OFDM symbol.

In one subembodiment, the multicarrier symbol is a SC-OFDM symbol.

In one embodiment, when bits in the second bit block are used for generating the target signal, the target radio resource block is the second radio resource block.

In one embodiment, when the second radio resource block and the first radio resource block are non-overlapping in time domain: the second radio resource block is used for transmitting the second bit block.

In one embodiment, the first bit block comprises a positive integer number of bit(s).

In one embodiment, the second bit block comprises a Transport Block (TB).

In one embodiment, the second bit block comprises a Code Block Group (CBG).

In one embodiment, the second bit block comprises a positive integer number of Code Block(s) (CB(s)).

In one embodiment, the second bit block comprises a positive integer number of bit(s).

In one embodiment, the third bit block comprises one TB.

In one embodiment, the third bit block comprises one CBG.

In one embodiment, the third bit block comprises a positive integer number of CB(s).

In one embodiment, the third bit block comprises a positive integer number of bit(s).

In one embodiment, the steps marked by the box FIB in FIG. 5B exist.

In one embodiment, the steps marked by the box FIB in FIG. 5B do not exist.

Embodiment 6A

Embodiment 6A illustrates a schematic diagram of relations among a number of bits comprised in a first bit sub-block, a number of bits comprised in a second bit sub-block, a target parameter and a first value according to one embodiment of the present application, as shown in FIG. 6A.

In Embodiment 6A, a number of bits comprised in a first bit sub-block and a number of bits comprised in a second bit sub-block are used to determine a target parameter, the target parameter being used to determine a first value.

In one embodiment, the first value is equal to the target parameter being multiplied by a first number plus a first offset.

In one embodiment, the first value is equal to a value by rounding up a target calculated value to a nearest integer, the target calculated value being equal to the target parameter multiplied by a first number.

In one subembodiment, the target calculated value is equal to a first calculated value or a second calculated value.

In one embodiment, the first number is related to a number of the resource elements capable of bearing the second bit block on the first time-frequency resource block.

In one embodiment, the first number is no greater than a number of the resource elements capable of bearing the second bit block on the first time-frequency resource block.

In one embodiment, the first number is equal to a number of the resource elements that can be occupied by the second bit block on multiple multicarrier symbols in the first time-frequency resource block.

In one embodiment, the first number is equal to $$\sum_{l=l_0}^{N_{symbol,all}-1} M_{offset}(l);$$

43
44 herein, the $N_{symbol,all}$ is equal to a number of multicarrier symbols occupied by the first time-frequency resource block, the $M_{offset}(l)$ is equal to a number of the resource elements that can be occupied by the second bit block on the l-th said multicarrier symbol, and the $l_0$ is an index of a said multicarrier symbol in the first time-frequency resource block.

In one embodiment, when a number of bits comprised in the first bit sub-block is greater than a number of bits comprised in the second bit sub-block, the target parameter is a first parameter; when a number of bits comprised in the first bit sub-block is no greater than a number of bits comprised in the second bit sub-block, the target parameter is a second parameter.

In one embodiment, when a number of bits comprised in the first bit sub-block is no less than a number of bits comprised in the second bit sub-block, the target parameter is a first parameter; when a number of bits comprised in the first bit sub-block is less than a number of bits comprised in the second bit sub-block, the target parameter is a second parameter.

In one embodiment, when a number of bits comprised in the second bit sub-block is greater than a number of bits comprised in the first bit sub-block, the target parameter is a first parameter; when a number of bits comprised in the second bit sub-block is no greater than a number of bits comprised in the first bit sub-block, the target parameter is a second parameter.

In one embodiment, when a number of bits comprised in the second bit sub-block is no less than a number of bits comprised in the first bit sub-block, the target parameter is a first parameter; when a number of bits comprised in the second bit sub-block is less than a number of bits comprised in the first bit sub-block, the target parameter is a second parameter.

In one embodiment, a first proportion is used to determine whether the target parameter is a first parameter or a second parameter, the first proportion being a ratio of the number of the bits comprised in the first bit sub-block to the number of the bits comprised in the second bit sub-block.

In one subembodiment, when the first proportion is greater than a first threshold, the target parameter is a first parameter; otherwise, the target parameter is a second parameter.

In one subembodiment, when the first proportion is no less than a first threshold, the target parameter is a first parameter; otherwise, the target parameter is a second parameter.

In one subembodiment, when the first proportion is greater than a first threshold, the target parameter is a second parameter; otherwise, the target parameter is a first parameter.

In one subembodiment, when the first proportion is no less than a first threshold, the target parameter is a second parameter; otherwise, the target parameter is a first parameter.

In one embodiment, a first difference is used to determine whether the target parameter is a first parameter or a second parameter, the first difference being a difference between the number of the bits comprised in the first bit sub-block and the number of the bits comprised in the second bit sub-block.

In one subembodiment, when the first difference is greater than a first threshold, the target parameter is a first parameter; otherwise, the target parameter is a second parameter.

In one subembodiment, when the first difference is no less than a first threshold, the target parameter is a first parameter; otherwise, the target parameter is a second parameter.

In one subembodiment, when the first difference is greater than a first threshold, the target parameter is a second parameter; otherwise, the target parameter is a first parameter.

In one subembodiment, when the first difference is no less than a first threshold, the target parameter is a second parameter; otherwise, the target parameter is a first parameter.

Embodiment 6B

Figure 6B:
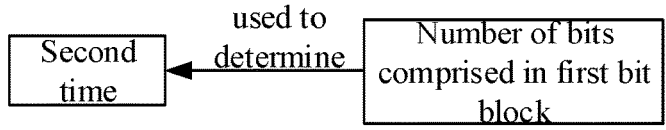
FIG. 6B illustrates a schematic diagram of a relation between a number of bits comprised in a first bit block and a second time according to one embodiment of the present application.

Embodiment 6B illustrates a schematic diagram of a relation between a number of bits comprised in a first bit block and a second time according to one embodiment of the present application, as shown in FIG. 6B.

In Embodiment 6B, a number of bits comprised in a first bit block is used to determine a second time.

In one embodiment, the first node in the present application performs calculation according to a number of bits comprised in the first bit block to determine time-domain resources associated with the first bit block in the second radio resource block as the first bit block is transmitted in the second radio resource block; the second time is an end time of time-domain resources associated with the first bit block in the second radio resource block as the first bit block is transmitted in the second radio resource block determined by the calculation performed by the first node.

In one subembodiment, the time-domain resources associated with the first bit block comprise time-domain resources occupied by a modulation symbol generated by the first bit block.

In one subembodiment, the end time of time-domain resources associated with the first bit block includes an end time of a last time-domain unit comprised in the time-domain resources associated with the first bit block in the second radio resource block as the first bit block is transmitted in the second radio resource block.

In one subembodiment, the time-domain unit is a multicarrier symbol.

In one subembodiment, the time-domain unit is an OFDM symbol.

In one subembodiment, the time-domain unit is a DFT-s-OFDM symbol.

In one subembodiment, the time-domain unit is a SC-OFD symbol.

In one embodiment, a third bit block is a bit block obtained by performing channel coding on the first bit block; a number of bits comprised in the third bit block is used to determine the second time.

In one embodiment, a ratio of a number of bits comprised in the first bit block to a number of bits comprised in the second bit block is used to determine the second time.

In one subembodiment, a number of time-frequency resource elements associated with the first bit block in the second radio resource block as the first bit block is transmitted in the second radio resource block is a smaller value between a first value and a second value; the first value is equal to $$\left\lceil \frac{(O_{ACK}+L_{ACK}) \cdot \beta_{offset}^{HARQ-ACK} \cdot \sum_{l=0}^{N_{symbol,all}-1} M_{offset}(l)}{\sum_{r=0}^{C-1} K_r} \right\rceil,$$

and the second value is equal to $$\left[\alpha \sum_{l=l_0}^{N_{symbol,all}-1} M_{offset}(l)\right];$$

herein, the $O_{ACK}$ is equal to a number of bits comprised in a HARQ-ACK codebook, the $L_{ACK}$ is equal to a number of CRC bits associated with the HARQ-ACK codebook; a number of bits comprised in the first bit block is equal to the $O_{ACK}+L_{ACK}$, the second signaling indicates a value $$\beta_{offset}^{HARQ-ACK};$$

the $N_{symbol,all}$ is equal to a number of multicarrier symbols occupied by the second radio resource block, the $M_{offset}(l)$ is equal to a number of time-frequency resource elements that can be occupied by the l-th bit block on a first said multicarrier symbol; the $$\sum_{r=0}^{C-1} K_r$$

is equal to a payload size of uplink data; a number of bits comprised in the second bit block is equal to the $$\sum_{r=0}^{C-1} K_r;$$

the $l_0$ is an index of a said multicarrier symbol in the second radio resource block; the $\alpha$ is used for limiting a number of time-frequency resource elements in the second radio resource block allocated to the first bit block.

In one subembodiment, a smaller value between the first value and the second value is used to determine the second time.

In one subembodiment, the first node determines the second time according to a smaller value between the first value and the second value as well as a resource mapping mode of the first bit block in the second radio resource block.

In one subembodiment, the time-frequency resource element is an RE.

In one embodiment, a sum of a number of bits comprised in the second bit block and a number of bits comprised in the first bit block is used to determine the second time.

In one embodiment, the first bit block comprises a CRC Payload.

Embodiment 7A

Figure 7A:
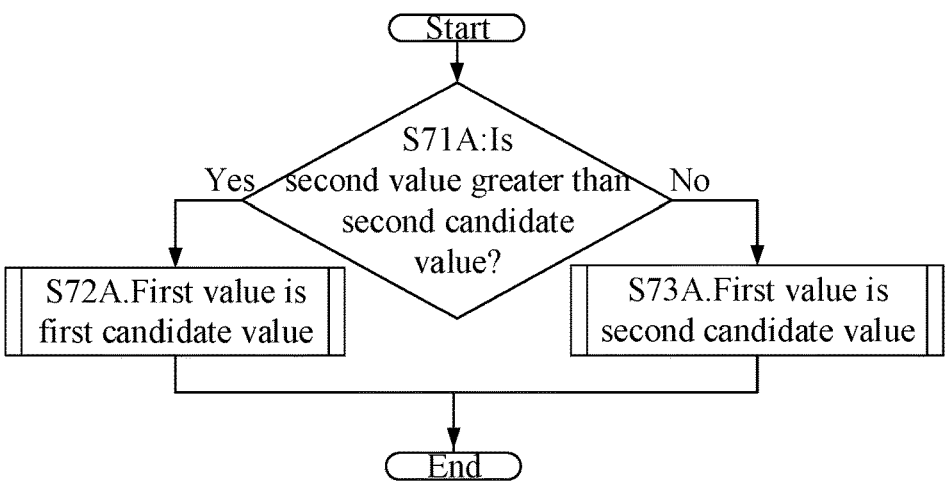
FIG. 7A illustrates a flowchart of determining whether a first value is a first candidate value or a second candidate value according to one embodiment of the present application.

Embodiment 7A illustrates a flowchart of determining whether a first value is a first candidate value or a second candidate value according to one embodiment of the present application, as shown in FIG. 7A.

In Embodiment 7A, determine whether a second value is greater than a second candidate value in step S71A; if so, move forward to step S72A to determine that a first value is a first candidate value; otherwise, move to step S73A to determine that a first value is a second candidate value.

In one embodiment, the second candidate value is greater than 0.

In one embodiment, the second candidate value is less than the first candidate value.

In one embodiment, the first signal is transmitted by the first node in the present application in the first time-frequency resource block, the first signal carrying the second bit block; when the first value is the first candidate value, the first bit sub-block is used for generating all or partial bits comprised in the second bit block, the second bit sub-block not being used for generating any bit comprised in the second bit block; when the first value is the second candidate value, the first bit sub-block is used for generating some bits comprised in the second bit block, the second bit sub-block being used for generating the other bits comprised in the second bit block.

In one embodiment, when the second value is no greater than the first candidate value and the second value is greater than the second candidate value, the first value is the first candidate value, a number of resource elements in the first time-frequency resource block used for transmitting the second bit block being equal to the second value; when the second value is no less than the second candidate value, the first value is the second candidate value, a number of resource elements in the first time-frequency resource block used for transmitting the second bit block being less than the second candidate value.

In one subembodiment, when the second value is greater than the first candidate value, the first value is the first candidate value, a number of resource elements in the first time-frequency resource block used for transmitting the second bit block being equal to the first value.

In one subembodiment, when the second value is less than the second candidate value, a number of resource elements in the first time-frequency resource block used for transmitting the second bit block is no less than the second value.

In one subembodiment, when the second value is no greater than the first candidate value and the second value is no less than the second candidate value, the second bit block only comprises the first bit sub-block between the first bit sub-block and the second bit sub-block.

In one subembodiment, when the second value is less than the second candidate value, the second bit block comprises all bits in the first bit sub-block and partial bits in the second bit sub-block.

In one subembodiment, when the second value is less than the second candidate value, the second bit block only comprises the first bit sub-block and the second bit sub-block.

In one subembodiment, when the second value is less than the second candidate value, the second bit block comprises all bits in the first bit sub-block and a third bit sub-block; the second bit sub-block is used for generating the third bit sub-block, a number of bits comprised in the third bit sub-block being less than a number of bits comprised in the second bit sub-block.

In one subembodiment, when the second value is less than the second candidate value, the first bit sub-block is used for generating some bits comprised in the second bit block, the second bit sub-block being used for generating the other bits comprised in the second bit block.

Embodiment 7B

Figure 7B:
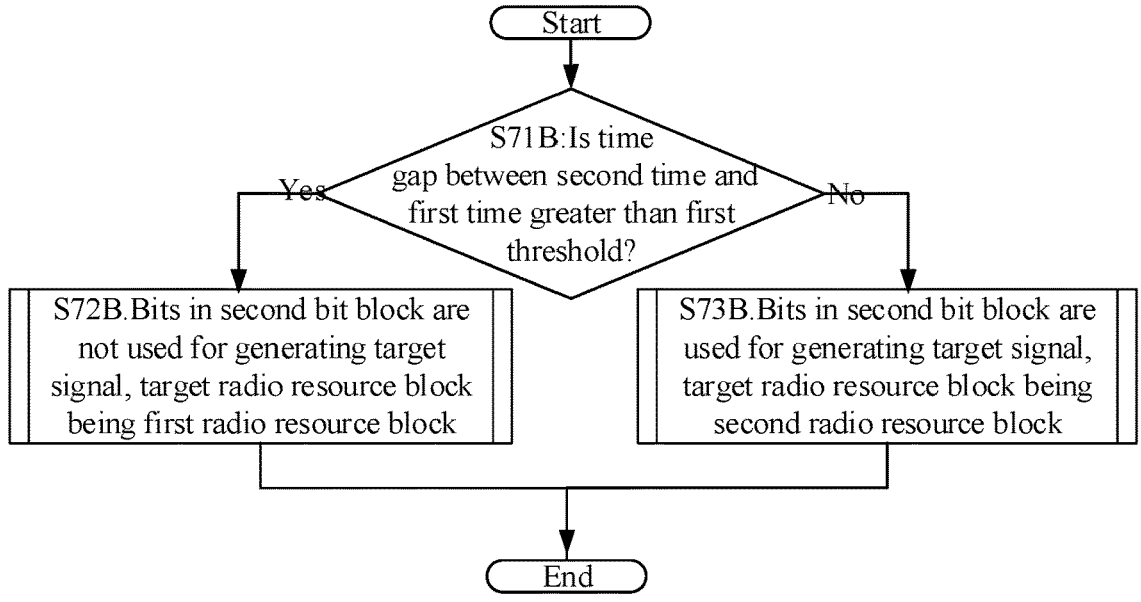
FIG. 7B illustrates a flowchart of determining whether bits in a second bit block are used for generating a target signal according to one embodiment of the present application.

Embodiment 7B illustrates a flowchart of determining whether bits in a second bit block are used for generating a target signal according to one embodiment of the present application, as shown in FIG. 7B.

In Embodiment 7B, the first node in the present application determines in step S71B whether a time gap between a second time and a first time is greater than a first threshold; if so, move forward to step S72B to determine that bits in the second bit block are not used for generating a target signal and that a target radio resource block is a first radio resource block; otherwise, move to step S73B to determine that bits in the second bit block are used for generating the target signal, and that a target radio resource block is a second radio resource block.

In one embodiment, when bits in the second bit block are used for generating the target signal, the target signal comprises a second sub-signal; the second sub-signal is an output by all or part of bits in the second bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, when bits in the second bit block are used for generating the target signal, the target signal comprises a second sub-signal; the second sub-signal is an output by all or part of bits in the second bit block, after being processed by the bundling operation, sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, when bits in the second bit block are used for generating the target signal, the target signal comprises a second sub-signal; the second sub-signal is an output by bits generated by all or part of bits in the second bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, when a time gap between the second time and the first time is no greater than the first threshold, the target signal comprises a first sub-signal and a second sub-signal, the first bit block being used for generating the first sub-signal, while the second bit block being used for generating the second sub-signal.

In one subembodiment, the target radio resource block is the second radio resource block.

In one embodiment, when a time gap between the second time and the first time is greater than the first threshold, of the first bit block and the second bit block only the first bit block is used for generating the target signal.

In one subembodiment, the target radio resource block is the first radio resource block.

In one embodiment, the phrase that bits in the second bit block are used for generating the target signal includes a meaning that: all bits in the second bit block are used for generating the target signal.

In one embodiment, the phrase that bits in the second bit block are used for generating the target signal includes a meaning that: partial bits in the second bit block are used for generating the target signal.

In one embodiment, all or partial bits in the second bit block being through the bundling operation are used for generating the target signal.

In one embodiment, all or partial bits in the second bit block being through the Logical Conjunction (Logical AND) operation are used for generating the target signal.

In one embodiment, all or partial bits in the second bit block being through the Logical Disjunction (Logical OR) operation are used for generating the target signal.

In one embodiment, all or partial bits in the second bit block being through the Logical Exclusive OR (Logical XOR) operation are used for generating the target signal.

In one embodiment, the phrase that a time gap between the second time and the first time is no greater than a first threshold comprises that the second time is a time as the same as the first time.

In one embodiment, a number of bits comprised in the first bit block is used to determine a third time; only when the third time is no earlier than the first time in time domain, a number of bits comprised in the first bit block can be used to determine the second time, and a time gap between the second time and the first time can be used to determine whether bits in the second bit block are used for generating the target signal.

In one subembodiment, when the third time is no earlier than the first time in time domain, the second time is the third time, and a time gap between the second time and the first time is used to determine whether bits in the second bit block are used for generating the target signal.

In one subembodiment, when the third time is earlier than the first time in time domain, bits in the second bit block are used for generating the target signal.

In one subembodiment, when a first condition set is fulfilled: when the third time is earlier than the first time in time domain, bits in the second bit block are used for generating the target signal.

In one subembodiment, only when a first condition set is fulfilled and the third time is no earlier than the first time in time domain, a number of bits comprised in the first bit block can be used to determine the second time, and a time gap between the second time and the first time can be used by the first node to determine whether bits in the second bit block are used for generating the target signal.

In one subembodiment, the phrase that a first condition set is fulfilled comprises that all conditions in the first condition set are being fulfilled.

In one subembodiment, the first condition set comprises a positive integer number of condition(s).

In one subembodiment, the conditions in the first condition set include: a third value being no greater than a first threshold; a number of bits comprised in the first bit block and a number of bits comprised in the second bit block being used together to determine the third value; and the first threshold being related to a number of time-frequency resource elements comprised in the second radio resource block.

In one subembodiment, the conditions in the first condition set include: a third value being no greater than a first threshold; a ratio of a number of bits comprised in the first bit block to a number of bits comprised in the second bit block being used to determine the third value; and the first threshold being related to a number of time-frequency resource elements comprised in the second radio resource block.

In one subembodiment, the time-frequency resource element is an RE.

In one subembodiment, when any condition in the first condition set is not being fulfilled, the first node determines that bits in the second bit block are not used for generating the target signal.

In one subembodiment, the first condition set comprises a Timeline condition, for the specific meaning of the Timeline condition, refer to 3GPP TS38.213, Section 9.2.5.

In one subembodiment, a condition in the first condition set is a Timeline condition related to at least one of $$\trianglelefteq T^{mux}_{proc,1}, T^{mux}_{proc,2}, T^{mux}_{proc,release} \text{ or } T^{mux}_{proc,CSI};$$

for the specific meaning of the Timeline condition, refer to 3GPP TS38.213, Section 9.2.5; specific meanings of the $$T^{mux}_{proc,1}, \text{ the } T^{mux}_{proc,2}, \text{ the } T^{mux}_{proc,release}$$

and the $$T^{mux}_{proc,CSI}$$

can also be found in 3GPP TS38.213, Section 9.2.5.

In one subembodiment, the first condition set comprises a condition indicating that the second radio resource block can support transmitting of the first bit block.

In one subembodiment, the first condition set comprises a Timeline condition, for the specific meaning of the Timeline condition, refer to 3GPP TS38.213, Section 9.2.5; the Timeline condition in the first condition set is related to an earliest multicarrier symbol in a first time-domain resource set, the first time-domain resource set comprising time-domain resources occupied by the first radio resource block and time-domain resources occupied by the second radio resource block.

In one subembodiment, the first node performs calculation according to a number of bits comprised in the first bit block to determine time-domain resources associated with the first bit block in the second radio resource block as the first bit block is transmitted in the second radio resource block; the third time is an end time of time-domain resources associated with the first bit block in the second radio resource block as the first bit block is transmitted in the second radio resource block determined by the calculation performed by the first node.

In one embodiment, a number of bits comprised in the first bit block is used to determine a third time; only when the third time is later than the first time in time domain, a number of bits comprised in the first bit block can be used to determine the second time, and a time gap between the second time and the first time can be used to determine whether bits in the second bit block are used for generating the target signal.

In one subembodiment, when the third time is later than the first time in time domain, the second time is the third time, and a time gap between the second time and the first time is used to determine whether bits in the second bit block are used for generating the target signal.

In one subembodiment, when the third time is no later than the first time in time domain, bits in the second bit block are used for generating the target signal.

In one subembodiment, when a first condition set is fulfilled: when the third time is no later than the first time in time domain, bits in the second bit block are used for generating the target signal.

In one subembodiment, only when a first condition set is fulfilled and the third time is later than the first time in time domain, a number of bits comprised in the first bit block can be used to determine the second time, and a time gap between the second time and the first time can be used by the first node to determine whether bits in the second bit block are used for generating the target signal.

In one subembodiment, the phrase that a first condition set is fulfilled comprises that all conditions in the first condition set are being fulfilled.

In one subembodiment, the first condition set comprises a positive integer number of condition(s).

In one subembodiment, the conditions in the first condition set include: a third value being no greater than a first threshold; a number of bits comprised in the first bit block and a number of bits comprised in the second bit block being used together to determine the third value; and the first threshold being related to a number of time-frequency resource elements comprised in the second radio resource block.

In one subembodiment, the conditions in the first condition set include: a third value being no greater than a first threshold; a ratio of a number of bits comprised in the first bit block to a number of bits comprised in the second bit block being used to determine the third value; and the first threshold being related to a number of time-frequency resource elements comprised in the second radio resource block.

In one subembodiment, the time-frequency resource element is an RE.

In one subembodiment, when any condition in the first condition set is not being fulfilled, the first node determines that bits in the second bit block are not used for generating the target signal.

In one subembodiment, the first condition set comprises a Timeline condition, for the specific meaning of the Timeline condition, refer to 3GPP TS38.213, Section 9.2.5.

In one subembodiment, a condition in the first condition set is a Timeline condition related to at least one of $$\trianglelefteq T^{mux}_{proc,1}, T^{mux}_{proc,2}, T^{mux}_{proc,release} \text{ or } T^{mux}_{proc,CSI};$$

for the specific meaning of the Timeline condition, refer to 3GPP TS38.213, Section 9.2.5; specific meanings of the $$T^{mux}_{proc,1}, \text{ the } T^{mux}_{proc,2}, \text{ the } T^{mux}_{proc,release}$$

and the $$T^{mux}_{proc,CSI}$$

can also be found in 3GPP TS38.213, Section 9.2.5.

In one subembodiment, the first condition set comprises a condition indicating that the second radio resource block can support transmitting of the first bit block.

In one subembodiment, the first condition set comprises a Timeline condition, for the specific meaning of the Timeline condition, refer to 3GPP TS38.213, Section 9.2.5; the Time-line condition in the first condition set is related to an earliest multicarrier symbol in a first time-domain resource set, the first time-domain resource set comprising time-domain resources occupied by the first radio resource block and time-domain resources occupied by the second radio resource block.

In one subembodiment, the first node performs calculation according to a number of bits comprised in the first bit block to determine time-domain resources associated with the first bit block in the second radio resource block as the first bit block is transmitted in the second radio resource block; the third time is an end time of time-domain resources associated with the first bit block in the second radio resource block as the first bit block is transmitted in the second radio resource block determined by the calculation performed by the first node.

Embodiment 8A

Figure 8A:
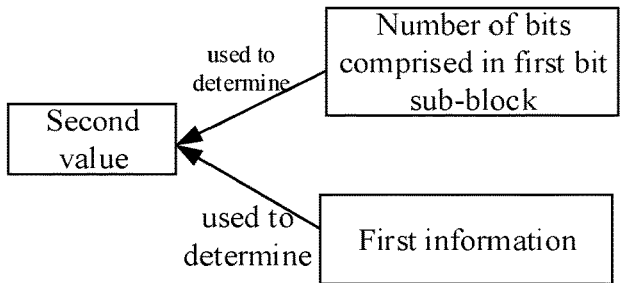
FIG. 8A illustrates a schematic diagram of relations among a number of bits comprised in a first bit sub-block, first information and a second value according to one embodiment of the present application.

Embodiment 8A illustrates a schematic diagram of relations among a number of bits comprised in a first bit sub-block, first information and a second value according to one embodiment of the present application, as shown in FIG. 8A.

In Embodiment 8A, the number of bits comprised in the first bit sub-block and first information are used together to determine a second value.

In one embodiment, the first information is a value of a number of the resource elements used for calculating bits associated with the first bit sub-block comprised in the second bit block.

In one embodiment, the first information is configured by higher layer.

In one embodiment, a product of a number of bits comprised in the first bit sub-block and the first information is used to determine the second value.

In one embodiment, a product of a first intermediate quantity and the first information is used to determine the second value, the first intermediate being greater than a number of bits comprised in the first bit sub-block.

In one subembodiment, the first intermediate quantity is equal to a sum of a number of bits comprised in the first bit sub-block and a number of CRC bits associated with the first bit sub-block.

In one subembodiment, the second value is linear with a product of the first intermediate quantity and the first information.

In one embodiment, the first information is a value $$\beta_{offset}^{HARQ-ACK};$$

herein, the definition of the $$\beta_{offset}^{HARQ-ACK}$$

can be found in TS38.213, Section 9.3.

In one embodiment, the first information is a value of $$\beta_{offset}^{HARQ-ACK}$$

used for a high-priority HARQ-ACK; herein, the definition of the $$\beta_{offset}^{HARQ-ACK}$$

can be found in TS38.213, Section 9.3.

In one embodiment, the first bit sub-block comprises a high-priority HARQ-ACK codebook, where the second value is equal to $$\left\lceil \frac{(O_{ACK} + L_{ACK}) \cdot \beta_{offset}^{HARQ-ACK} \cdot \sum_{l=0}^{N_{symbol,all}-1} M_{offset}(l)}{\sum_{r=0}^{C-1} K_r} \right\rceil;$$

herein, the $O_{ACK}$ is equal to the high-priority HARQ-ACK bit number, the $L_{ACK}$ is equal to a CRC bit number associated with the high-priority HARQ-ACK bit number; $O_{ACK}+L_{ACK}$ is equal to a number of bits comprised in the first bit sub-block, the $$\beta_{offset}^{HARQ-ACK}$$

is equal to the first information, and the $N_{symbol,all}$ is equal to a number of multicarrier symbols occupied by the first time-frequency resource block, the $M_{offset}(l)$ is equal to a number of the resource elements that can be occupied by the second bit block on the l-th said multicarrier symbol; the $$\sum_{r=0}^{C-1} K_r$$

is equal to a payload size of uplink data carried by the first signal.

In one embodiment, the first bit sub-block comprises a high-priority HARQ-ACK codebook, where the second value is equal to $$\left\lceil \frac{(O_{ACK} + L_{ACK}) \cdot \beta_{offset}^{HARQ-ACK} \cdot \sum_{l=0}^{N_{symbol,all}-1} M_{offset}(l)}{\sum_{r=0}^{C-1} K_r} \right\rceil;$$

herein, the $O_{ACK}$ is equal to the high-priority HARQ-ACK bit number, the $L_{ACK}$ is equal to a CRC bit number associated with the high-priority HARQ-ACK bit number; a number of bits comprised in the first bit sub-block is equal to $O_{ACK}$, the $$\beta_{offset}^{HARQ-ACK}$$

is equal to the first information, and the $N_{symbol,all}$ is equal to a number of multicarrier symbols occupied by the first time-frequency resource block, the $M_{offset}(l)$ is equal to a number of the resource elements that can be occupied by the second bit block on the l-th said multicarrier symbol; the $$\sum_{r=0}^{C-1} K_r$$

is equal to a payload size of uplink data carried by the first signal.

In one embodiment, the second value is equal to a value obtained by rounding up a third calculated value to a nearest integer, the third calculated value being linear with a product of a number of bits comprised in the first bit sub-block and the first information.

In one embodiment, the first bit sub-block comprises a high-priority HARQ-ACK codebook.

In one embodiment, the first bit sub-block comprises a high-priority HARQ-ACK codebook and a corresponding CRC bit.

Embodiment 8B

Figure 8B:
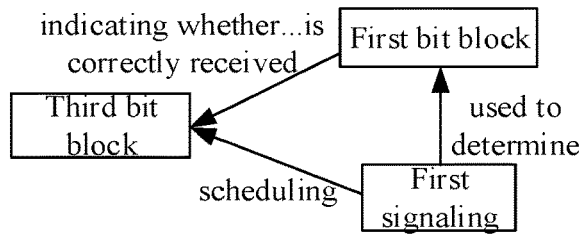
FIG. 8B illustrates a schematic diagram of relations among a first bit block, a first signaling and a third bit block according to one embodiment of the present application.

Embodiment 8B illustrates a schematic diagram of relations among a first bit block, a first signaling and a third bit block according to one embodiment of the present application, as shown in FIG. 8B.

In Embodiment 8B, a first signaling is used to determine a first bit block, the first signaling comprising scheduling information of a third bit block, the first bit block comprising information indicating whether the third bit block is correctly received.

In one embodiment, the scheduling information comprises one or more of indication information of time-domain resources being occupied, indication information of frequency-domain resources being occupied, an MCS, configuration information of Demodulation Reference Signals (DMRS), a HARQ process ID, a Redundancy Version (RV), a New Data Indicator (NDI) or a Priority.

In one embodiment, the first bit block comprises UCI.

In one embodiment, the first bit block comprises high-priority UCI.

In one embodiment, the first bit block comprises a UCI for URLLC Service Type.

In one embodiment, the first bit block comprises a HARQ-ACK codebook.

In one embodiment, the first bit block comprises a high-priority HARQ-ACK codebook.

In one embodiment, the first bit block comprises a HARQ-ACK codebook for URLLC Service Type.

In one embodiment, the first bit block comprises a HARQ-ACK codebook, the HARQ-ACK codebook comprising a positive integer number of HARQ-ACK bit(s) indicating whether the third bit block is correctly received.

In one embodiment, the second signaling comprises scheduling information of the second bit block.

In one embodiment, the first node receives a second signal; the second signal carries a fourth bit block, the second signaling comprising scheduling information of the fourth bit block, and the second bit block comprising information indicating whether the fourth bit block is correctly received.

In one subembodiment, the second bit block comprises a positive integer number of HARQ-ACK bit(s) indicating whether the fourth bit block is correctly received.

Embodiment 9A

Figure 9A:
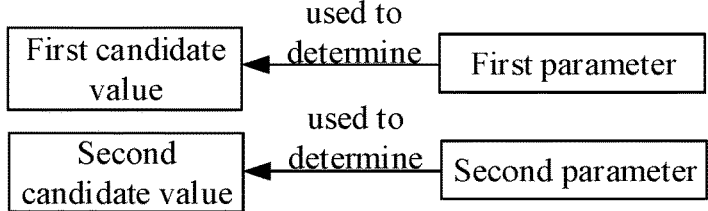
FIG. 9A illustrates a schematic diagram of relations among a first parameter, a first candidate value, a second parameter and a second candidate value according to one embodiment of the present application.

Embodiment 9A illustrates a schematic diagram of relations among a first parameter, a first candidate value, a second parameter and a second candidate value according to one embodiment of the present application, as shown in FIG. 9A.

In Embodiment 9A, a first parameter is used to determine a first candidate value, while a second parameter is used to determine a second candidate value.

In one embodiment, the first candidate value is equal to a value obtained by rounding up a first calculated value to a nearest integer, the first calculated value being equal to the first parameter being multiplied by a first number.

In one embodiment, the second candidate value is equal to a value obtained by rounding up a second calculated value to a nearest integer, the second calculated value being equal to the second parameter being multiplied by a first number.

In one embodiment, the first parameter is a scaling parameter.

In one embodiment, the first parameter is a scaling parameter configured for a high-priority UCI.

In one embodiment, the first parameter is a parameter configured by higher layer.

In one embodiment, the first parameter is a parameter configured by an RRC layer.

In one embodiment, the second parameter is a scaling parameter configured for a low-priority UCI.

In one embodiment, the second parameter is a parameter configured by higher layer.

In one embodiment, the second parameter is a parameter configured by an RRC layer.

In one embodiment, the first parameter and the second parameter are respectively scaling parameters for configuring UCIs of different priorities.

In one embodiment, the first candidate value is equal to the first parameter being multiplied by a first number plus a first offset.

In one embodiment, the second candidate value is equal to the second parameter being multiplied by a first number plus a second offset.

In one embodiment, the first parameter and the second parameter are respectively parameters configured for different priorities.

In one embodiment, the first parameter and the second parameter are respectively parameters configured for different service types.

In one embodiment, the first parameter and the second parameter are respectively parameters configured for High Priority and Low Priority.

In one embodiment, the first parameter and the second parameter are respectively parameters configured for URLLC Service Type and eMBB Service Type.

Embodiment 9B

Figure 9B:
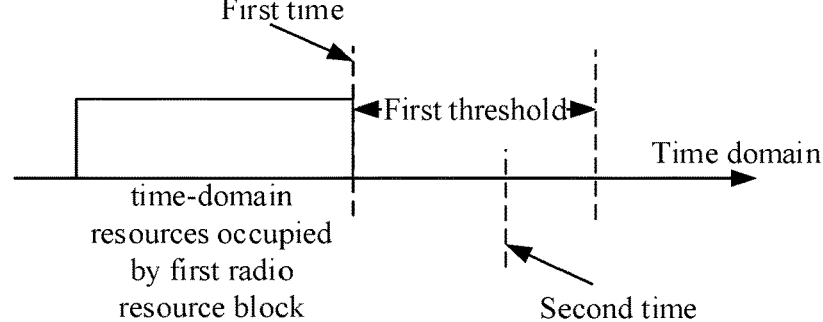
FIG. 9B illustrates a schematic diagram of relations among a first radio resource block, a first time, a second time and a first threshold according to one embodiment of the present application.

Embodiment 9B illustrates a schematic diagram of relations among a first radio resource block, a first time, a second time and a first threshold according to one embodiment of the present application, as shown in FIG. 9B.

In Embodiment 9B, an end time of a first radio resource block in time domain is a first time, where a time gap between a second time and the first time is no greater than a first threshold.

In one subembodiment of Embodiment 9B, the time gap between the second time and the first time is less than the first threshold.

In one subembodiment of Embodiment 9B, the time gap between the second time and the first time is equal to the first threshold.

In one subembodiment of Embodiment 9B, the second time is the first time.

In one subembodiment of Embodiment 9B, bits in the second bit block in the present application are used for generating the target signal in the present application.

In one subembodiment of Embodiment 9B, the target radio resource block in the present application is the second radio resource block in the present application.

In one embodiment, the first threshold is configured by higher layer.

In one embodiment, the first threshold is a candidate threshold in a threshold set configured by higher layer; the first threshold set comprises multiple candidate thresholds.

In one embodiment, the first threshold is equal to a time gap between an end time of a first time window and the first time; the first time window comprises time-domain resources occupied by the first radio resource block.

In one subembodiment, an end time of the first time window is no earlier than the first time in terms of time domain.

In one subembodiment, an end time of the first time window is later than the first time in terms of time domain.

In one subembodiment, the first time window comprises time-domain resources other than time-domain resources occupied by the first radio resource block.

In one subembodiment, the first time window does not comprise time-domain resources other than time-domain resources occupied by the first radio resource block.

In one subembodiment, the first time window is a slot comprising time-domain resources occupied by the first radio resource block.

In one subembodiment, the first time window is a sub-slot comprising time-domain resources occupied by the first radio resource block.

In one subembodiment, the first time window is multiple sub-slots comprising time-domain resources occupied by the first radio resource block.

In one embodiment, the first threshold is no less than 0.

In one embodiment, the first threshold is equal to 0.

In one embodiment, the first threshold is equal to a duration of a positive integer number of consecutive multi-carrier symbols.

In one embodiment, the first threshold is a dynamically indicated value.

In one embodiment, the first threshold is related to the size of time-domain resources occupied by the first radio resource block.

In one embodiment, a time gap between the second time and the first time is equal to a duration of a positive integer number of consecutive multicarrier symbols.

In one embodiment, the first threshold is equal to a maximum Additional Delay that is allowable.

In one embodiment, the first threshold is equal to a time gap between a time after the first time and the first time.

Embodiment 10A

Figure 10A:
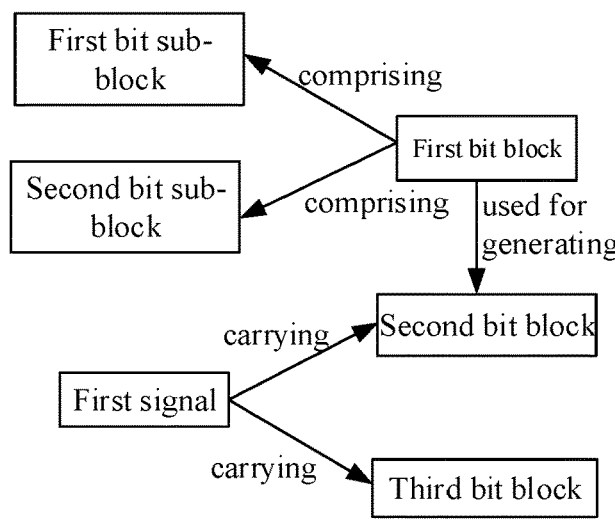
FIG. 10A illustrates a schematic diagram of relations among a first signal, a first bit block, a second bit block, a third bit block, a first bit sub-block and a second bit sub-block according to one embodiment of the present application.

Embodiment 10A illustrates a schematic diagram of relations among a first signal, a first bit block, a second bit block, a third bit block, a first bit sub-block and a second bit sub-block according to one embodiment of the present application, as shown in FIG. 10A.

In Embodiment 10A, a first signal carries a second bit block and a third bit block, where a first bit block is used for generating the second bit block, and the first bit block comprises a first bit sub-block and a second bit sub-block.

In one embodiment, bits associated with the first bit sub-block comprised in the second bit block include all bits in the first bit sub-block.

In one embodiment, bits associated with the first bit sub-block comprised in the second bit block only include partial bits in the first bit sub-block.

In one embodiment, bits associated with the first bit sub-block comprised in the second bit block are obtained by a positive integer number of bits in the first bit block through Logical AND/Logical OR/Logical Xor operation.

In one embodiment, the second bit block comprises all bits in the first bit block.

In one embodiment, the second bit block only comprises all bits in the first bit block.

In one embodiment, the second bit block only comprises the first bit sub-block between the first bit sub-block and the second bit sub-block.

In one embodiment, the second bit block comprises all bits in the first bit sub-block and partial bits in the second bit sub-block.

In one embodiment, the second bit block comprises all bits in the first bit sub-block and all bits in the second bit sub-block.

In one embodiment, any bit in the second bit block is obtained by a positive integer number of bits in the first bit block through Logical AND/Logical OR/Logical Xor operation.

In one embodiment, the second bit block comprises all bits in the first bit sub-block and the third bit sub-block; the second bit sub-block is used for generating the third bit sub-block, a number of bits comprised in the third bit sub-block being less than a number of bits comprised in the second bit sub-block.

In one subembodiment, the third bit sub-block is obtained by a positive integer number of bits in the second bit sub-block through Logical AND/Logical OR/Logical Xor operation.

In one embodiment, the first bit sub-block is used for generating all or partial bits comprised in the second bit block, the second bit sub-block not being used for generating any bit comprised in the second bit block.

In one embodiment, the first bit sub-block is used for generating some bits comprised in the second bit block, the second bit sub-block being used for generating the other bits comprised in the second bit block.

In one embodiment, the first signal comprises a first sub-signal; the first sub-signal is obtained by the second bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, the first signal comprises a first sub-signal a second sub-signal; the first sub-signal is obtained by the second bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion; the second sub-signal is obtained by the third bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

Embodiment 10B

Figure 10B:
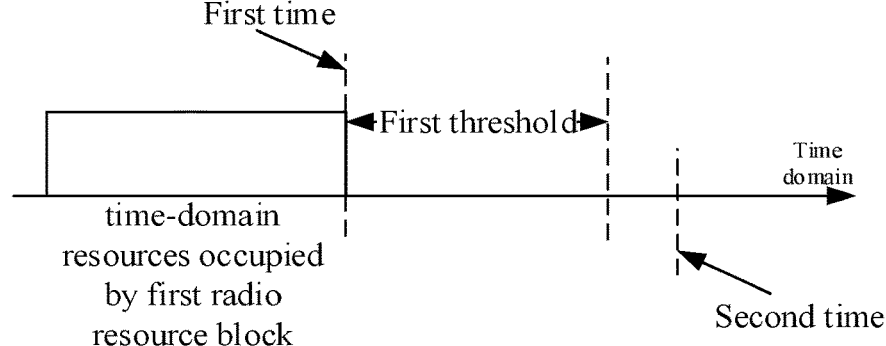
FIG. 10B illustrates a schematic diagram of relations among a first radio resource block, a first time, a second time and a first threshold according to another embodiment of the present application.

Embodiment 10B illustrates a schematic diagram of relations among a first radio resource block, a first time, a second time and a first threshold according to another embodiment of the present application, as shown in FIG. 10B.

In Embodiment 10B, an end time of a first radio resource block in time domain is a first time, where a time gap between a second time and the first time is greater than a first threshold.

In one subembodiment of Embodiment 10B, bits in the second bit block in the present application are not used for generating the target signal in the present application.

In one subembodiment of Embodiment 10B, the target radio resource block in the present application is the first radio resource block in the present application.

Embodiment 11A

Figure 11A:
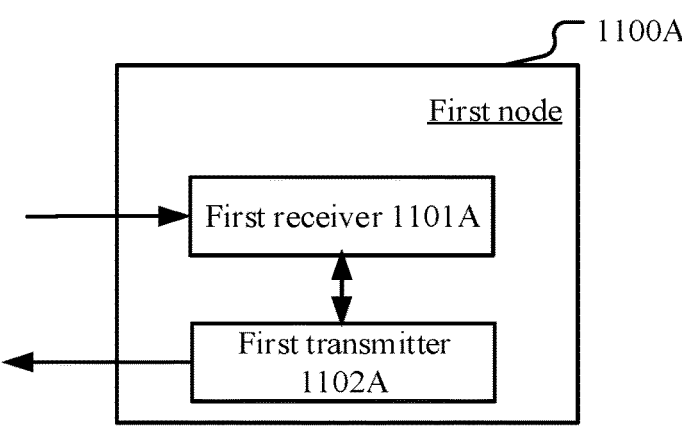
FIG. 11A illustrates a structure block diagram of a processing device in a first node according to one embodiment of the present application.

Embodiment 11A illustrates a structure block diagram a processing device in a first node according to one embodiment of the present application, as shown in FIG. 11A. In FIG. 11A, a processing device 1100A in the first node comprises a first receiver 1101A and a first transmitter 1102A.

In one embodiment, the first node 1100A is a UE.

In one embodiment, the first node 1100A is a relay node.

In one embodiment, the first node 1100A is vehicle-mounted communication equipment.

In one embodiment, the first node 1100A is a UE supporting V2X communications.

In one embodiment, the first node 1100A is a relay node supporting V2X communications.

In one embodiment, the first receiver 1101A comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1101A comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101A comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101A comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101A comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1102A comprises at least one of the antenna 452, the transmitter 454, the multi-antenna transmitting processor 457, the transmitting processor 468, the controller/processor 459, the memory 460 or the data source 467 in FIG. 4 of the present application.

In one embodiment, the first transmitter 1102A comprises at least the first five of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1102A comprises at least the first four of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1102A comprises at least the first three of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1102A comprises at least the first two of the antenna 452, the transmitter 454, the multi-antenna transmitting processor 457, the transmitting processor 468, the controller/processor 459 the memory 460 and the data source 467 in FIG. 4 of the present application.

In Embodiment 11A, the first receiver 1101A receives first information; the first transmitter 1102A transmits a first signal in a first time-frequency resource block, the first signal carrying a second bit block; herein, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

In one embodiment, the first value is unrelated to the first information.

In one embodiment, the first value is no greater than a first candidate value and no less than a second candidate value; a first parameter is used to determine the first candidate value, while a second parameter is used to determine the second candidate value; the first parameter and the second parameter respectively correspond to a first priority and a second priority; the priority corresponding to the first bit sub-block is the first priority, and the priority corresponding to the second bit sub-block is the second priority.

In one embodiment, a target parameter is used to determine the first value; the target parameter is a first parameter or a second parameter, the first parameter and the second parameter respectively corresponding to a first priority and a second priority; the priority corresponding to the first bit sub-block is the first priority, and the priority corresponding to the second bit sub-block is the second priority; the number of bits comprised in the first bit sub-block and a number of bits comprised in the second bit sub-block are used together to determine the target parameter.

In one embodiment, when a second value is greater than the second candidate value, the first value is the first candidate value; when the second value is no greater than the second candidate value, the first value is the second candidate value.

In one embodiment, the first receiver 1101A receives a first signaling and a second signaling; herein, the first signaling indicates a first radio resource block, while the second signaling indicates a second radio resource block; at least one of the first radio resource block or the second radio resource block is overlapping with the first time-frequency resource block in time domain.

In one embodiment, the first signal carries a third bit block; the first time-frequency resource block is a time-frequency resource block configured for the third bit block; the third bit block is the first-type bit block between a first-type bit block and a second-type bit block.

In one embodiment, the first time-frequency resource block comprises a PUSCH; the first node transmits the first signal in the PUSCH, the first signal carrying the second bit block; the first bit sub-block and the second bit sub-block respectively comprise a HARQ-ACK codebook of the first priority and a HARQ-ACK codebook of the second priority; the first parameter and the second parameter are respectively two scaling parameters configured for the HARQ-ACK codebook of the first priority and the HARQ-ACK codebook of the second priority; the first parameter is used to determine the first candidate value, while the second parameter is used to determine the second candidate value; the number of bits comprised in the first bit sub-block and the first information are used together to determine a second value; when a second value is greater than the second candidate value, the first value is the first candidate value; when the second value is no greater than the second candidate value, the first value is the second candidate value; a number of the REs in the PUSCH used for transmitting bits associated with the first bit sub-block comprised in the second bit block is equal to a minimum value between the first value and the second value; a number of REs in the PUSCH used for transmitting the second bit block is no greater than a first value.

In one embodiment, the first time-frequency resource block comprises a PUSCH; the first-type bit block is a bit block comprising low-priority data, while the second-type bit block is a bit block comprising high-priority data, the PUSCH is a time-frequency resource block configured for the third bit block, the third bit block being the first-type bit block; only when the second value is no greater than the first candidate value will the first signal be transmitted by the first node in the PUSCH; when the second value is greater than the first candidate value, the first signal is not transmitted by the first node in the PUSCH; the first bit sub-block and the second bit sub-block respectively comprise a HARQ-ACK codebook of the first priority and a HARQ-ACK codebook of the second priority; the first parameter and the second parameter are respectively two scaling parameters config-ured for the HARQ-ACK codebook of the first priority and the HARQ-ACK codebook of the second priority; the first parameter is used to determine the first candidate value, while the second parameter is used to determine the second candidate value; the number of bits comprised in the first bit sub-block and the first information are used together to determine a second value.

In one subembodiment, the low-priority data is eMBB Service Type data, while the high-priority data is URLLC Service Type data.

In one subembodiment, when the first signal is transmit-ted by the first node in the PUSCH: the first signal carries the second bit block; when a second value is greater than the second candidate value, the first value is the first candidate value; when the second value is no greater than the second candidate value, the first value is the second candidate value; a number of the REs in the PUSCH used for transmitting bits associated with the first bit sub-block comprised in the second bit block is equal to a minimum value between the first value and the second value; a number of REs in the PUSCH used for transmitting the second bit block is no greater than a first value.

In one subembodiment, when the first signal is not trans-mitted by the first node in the PUSCH, the first bit sub-block is transmitted by the first node in the first radio resource block, the first radio resource block comprising a PUCCH.

In one embodiment, the first time-frequency resource block comprises a PUSCH; the first node transmits the first signal in the PUSCH, the first signal carrying the second bit block; the first bit sub-block and the second bit sub-block respectively comprise a HARQ-ACK codebook of the first priority and a HARQ-ACK codebook of the second priority; the first parameter and the second parameter are respectively two scaling parameters configured for the HARQ-ACK codebook of the first priority and the HARQ-ACK codebook of the second priority; the first parameter is used to deter-mine the first candidate value, while the second parameter is used to determine the second candidate value; the number of bits comprised in the first bit sub-block and the first infor-mation are used together to determine a second value; a target parameter is used to determine the first value; the target parameter being a first parameter or a second param-eter, the number of bits comprised in the first bit sub-block and a number of bits comprised in the second bit sub-block are used together to determine the target parameter; a number of the REs in the PUSCH used for transmitting bits associated with the first bit sub-block comprised in the second bit block is equal to a minimum value between the first value and the second value; a number of REs in the PUSCH used for transmitting the second bit block is no greater than a first value.

Embodiment 11B

Figure 11B:
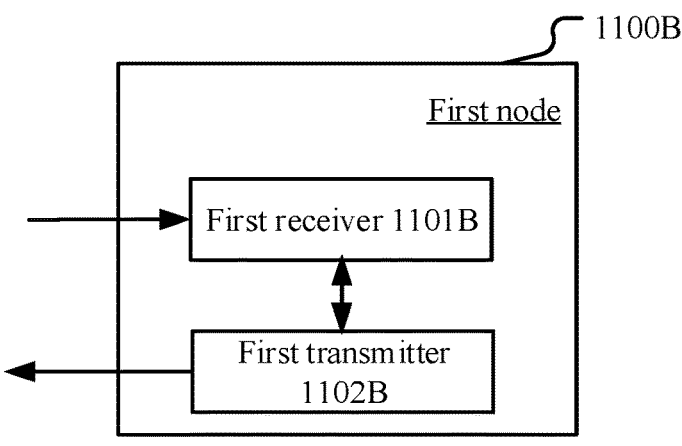
FIG. 11B illustrates a structure block diagram of a processing device in a first node according to one embodiment of the present application.

Embodiment 11B illustrates a structure block diagram a processing device in a first node according to one embodi-ment of the present application, as shown in FIG. 11B. In FIG. 11B, a processing device 1100B in the first node comprises a first receiver 1101B and a first transmitter 1102B.

In one embodiment, the first node 1100B is a UE.

In one embodiment, the first node 1100B is a relay node.

In one embodiment, the first node 1100B is vehicle-mounted communication equipment.

In one embodiment, the first node 1100B is a UE sup-porting V2X communications.

In one embodiment, the first node 1100B is a relay node supporting V2X communications.

In one embodiment, the first receiver 1101B comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1101B comprises at least the first five of the antenna 452, the receiver 454, the multi-antenna receiving processor 458, the receiving pro-cessor 456, the controller/processor 459, the memory 460 and the data source 467 in FIG. 4 of the present application.

In one embodiment, the first receiver 1101B comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101B comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101B comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1102B comprises at least one of the antenna 452, the transmitter 454, the multi-antenna transmitting processor 457, the transmitting processor 468, the controller/processor 459, the memory 460 or the data source 467 in FIG. 4 of the present application.

In one embodiment, the first transmitter 1102B comprises at least the first five of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1102B comprises at least the first four of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1102B comprises at least the first three of the antenna 452, the transmitter 454, the multi-antenna transmitting processor 457, the transmitting processor 468, the controller/processor 459 the memory 460 and the data source 467 in FIG. 4 of the present application.

In one embodiment, the first transmitter 1102B comprises at least the first two of the antenna 452, the transmitter 454, the multi-antenna transmitting processor 457, the transmitting processor 468, the controller/processor 459 the memory 460 and the data source 467 in FIG. 4 of the present application.

In Embodiment 11B, the first receiver 1101B receives a first signaling and a second signaling, the first signaling and the second signaling respectively being used to determine a first radio resource block and a second radio resource block; and the first transmitter 1102B transmits a target signal in a target radio resource block; herein, the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block is used to determine a second time; the second time is no earlier than the first time in time domain; a time gap between the second time and the first time is used to determine whether bits in the second bit block are used for generating the target signal; the first bit block and the second bit block respectively correspond to different types.

In one embodiment, the second time is after the first time in time domain.

In one embodiment, when a time gap between the second time and the first time is no greater than a first threshold, bits in the second bit block are used for generating the target signal, the target radio resource block being the second radio resource block; when a time gap between the second time and the first time is greater than the first threshold, bits in the second bit block are not used for generating the target signal, the target radio resource block being the first radio resource block.

In one embodiment, the first threshold is greater than 0.

In one embodiment, when bits comprised in the second bit block are used for generating the target signal, the second time is an end time of time-domain resources occupied by a modulation symbol generated by the first bit block; the second time is before an end time of the second radio resource block in time domain.

In one embodiment, the first receiver 1101B receives a first signal; herein, the first signal carries a third bit block, the first signaling comprising scheduling information of the third bit block, the first bit block comprising information indicating whether the third bit block is correctly received.

In one embodiment, when bits comprised in the second bit block are used for generating the target signal, time-domain resources before those occupied by a reference signal which is earliest in time domain in the target radio resource block are used for transmitting bits associated with the first bit block.

In one embodiment, the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time, and a number of bits comprised in the first bit block is used by the first node to perform calculation to determine the second time; the second time is no earlier than the first time in time domain; a time gap between the second time and the first time is used to determine whether bits in the second bit block are used for generating the target signal.

In one subembodiment, the high-priority UCI comprises a URLLC Service Type HARQ-ACK codebook.

In one subembodiment, the low-priority service data comprises eMBB Service Type service data.

In one embodiment, the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time, and a number of bits comprised in the first bit block is used by the first node to perform calculation to determine the second time; the second time is no earlier than the first time in time domain; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH.

In one subembodiment, the high-priority UCI comprises a URLLC Service Type HARQ-ACK codebook.

In one subembodiment, the low-priority service data comprises eMBB Service Type service data.

In one subembodiment, the first threshold is equal to 0.

In one embodiment, the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time, and a number of bits comprised in the first bit block is used by the first node to perform calculation to determine the second time; the second time is no earlier than the first time in time domain; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is greater than 0.

In one subembodiment, the high-priority UCI comprises a URLLC Service Type HARQ-ACK codebook.

In one subembodiment, the low-priority service data comprises eMBB Service Type service data.

In one embodiment, a first condition set is fulfilled; the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time, and a number of bits comprised in the first bit block is used by the first node to perform calculation to determine the second time; the second time is no earlier than the first time in time domain; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH.

In one subembodiment, the high-priority UCI comprises a URLLC Service Type HARQ-ACK codebook.

In one subembodiment, the low-priority service data comprises eMBB Service Type service data.

In one subembodiment, the first threshold is equal to 0.

In one subembodiment, the first condition set comprises a Timeline condition, for the specific meaning of the Timeline condition, refer to 3GPP TS38.213, Section 9.2.5.

In one subembodiment, the condition in the first condition set is a Timeline condition related to at least one of $$T_{proc,1}^{mux}, T_{proc,2}^{mux}, T_{proc,release}^{mux} \text{ or } T_{proc,CSI}^{mux};$$

for the specific meaning of the Timeline condition, refer to 3GPP TS38.213, Section 9.2.5; specific meanings of the $$T_{proc,1}^{mux}, \text{ the } T_{proc,2}^{mux}, \text{ the } T_{proc,release}^{mux}$$

and the $$T_{proc,CSI}^{mux}$$

can also be found in 3GPP TS38.213, Section 9.2.5.

In one subembodiment, the first condition set comprises a condition indicating that the PUSCH can support transmitting of the first bit block.

In one subembodiment, the phrase that a first condition set is fulfilled comprises that all conditions in the first condition set are being fulfilled.

In one embodiment, a first condition set is fulfilled; the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time, and a number of bits comprised in the first bit block is used by the first node to perform calculation to determine the second time; the second time is no earlier than the first time in time domain; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is greater than 0.

In one subembodiment, the high-priority UCI comprises a URLLC Service Type HARQ-ACK codebook.

In one subembodiment, the low-priority service data comprises eMBB Service Type service data.

In one subembodiment, the first condition set comprises a Timeline condition, for the specific meaning of the Timeline condition, refer to 3GPP TS38.213, Section 9.2.5.

In one subembodiment, the condition in the first condition set is a Timeline condition related to at least one of $$T_{proc,1}^{mux}, T_{proc,2}^{mux}, T_{proc,release}^{mux} \text{ or } T_{proc,CSI}^{mux};$$

for the specific meaning of the Timeline condition, refer to 3GPP TS38.213, Section 9.2.5; specific meanings of the $$T^{mux}_{proc,1}, \text{ the } T^{mux}_{proc,2}, \text{ the } T^{mux}_{proc,release}$$

and the $$T^{mux}_{proc,CSI}$$

can also be found in 3GPP TS38.213, Section 9.2.5.

In one subembodiment, the first condition set comprises a condition indicating that the PUSCH can support transmitting of the first bit block.

In one subembodiment, the phrase that a first condition set is fulfilled comprises that all conditions in the first condition set are being fulfilled.

In one embodiment, a first condition set is fulfilled; the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time, and a number of bits comprised in the first bit block is used by the first node to perform calculation to determine the second time; the second time is no earlier than the first time in time domain; a time gap between the second time and the first time is used to determine whether bits in the second bit block are used for generating the target signal.

In one subembodiment, the high-priority UCI comprises a URLLC Service Type HARQ-ACK codebook.

In one subembodiment, the low-priority service data comprises eMBB Service Type service data.

In one subembodiment, the first condition set comprises a Timeline condition, for the specific meaning of the Timeline condition, refer to 3GPP TS38.213, Section 9.2.5.

In one subembodiment, the condition in the first condition set is a Timeline condition related to at least one of $$T^{mux}_{proc,1}, T^{mux}_{proc,2}, T^{mux}_{proc,release} \text{ or } T^{mux}_{proc,CSI};$$

for the specific meaning of the Timeline condition, refer to 3GPP TS38.213, Section 9.2.5; specific meanings of the $$T^{mux}_{proc,1}, \text{ the } T^{mux}_{proc,2}, \text{ the } T^{mux}_{proc,release}$$

and the $$T^{mux}_{proc,CSI}$$

can also be found in 3GPP TS38.213, Section 9.2.5.

In one subembodiment, the first condition set comprises a condition indicating that the PUSCH can support transmitting of the first bit block.

In one subembodiment, the phrase that a first condition set is fulfilled comprises that all conditions in the first condition set are being fulfilled.

In one embodiment, the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time; a number of bits comprised in the first bit block is used to determine a third time; when the third time is no earlier than the first time in time domain, a number of bits comprised in the first bit block is used to determine the second time, the second time being no earlier than the first time in time domain, and a time gap between the second time and the first time is used to determine whether bits in the second bit block are used for generating the target signal.

In one subembodiment, when the third time is no earlier than the first time in time domain: the second time is the third time; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is greater than 0.

In one subembodiment, when the third time is no earlier than the first time in time domain: the second time is the third time; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is equal to 0.

In one subembodiment, when the third time is earlier than the first time in time domain, bits in the second bit block are used for generating the target signal.

In one subembodiment, the high-priority UCI comprises a URLLC Service Type HARQ-ACK codebook.

In one subembodiment, the low-priority service data comprises eMBB Service Type service data.

In one embodiment, the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time; a number of bits comprised in the first bit block is used to determine a third time; when the third time is later than the first time in time domain, a number of bits comprised in the first bit block is used to determine the second time, the second time being later than the first time in time domain, and a time gap between the second time and the first time is used to determine whether bits in the second bit block are used for generating the target signal.

In one subembodiment, when the third time is later than the first time in time domain: the second time is the third time; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is greater than 0.

In one subembodiment, when the third time is no later than the first time in time domain, bits in the second bit block are used for generating the target signal.

In one subembodiment, the high-priority UCI comprises a URLLC Service Type HARQ-ACK codebook.

In one subembodiment, the low-priority service data comprises eMBB Service Type service data.

In one embodiment, a first condition set is fulfilled; the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time; a number of bits comprised in the first bit block is used to determine a third time; when the third time is no earlier than the first time in time domain, a number of bits comprised in the first bit block is used to determine the second time, the second time being no earlier than the first time in time domain, and a time gap between the second time and the first time is used to determine whether bits in the second bit block are used for generating the target signal.

In one subembodiment, when the third time is no earlier than the first time in time domain: the second time is the third time; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is greater than 0.

In one subembodiment, when the third time is no earlier than the first time in time domain: the second time is the third time; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is equal to 0.

In one subembodiment, when the third time is earlier than the first time in time domain, bits in the second bit block are used for generating the target signal.

In one subembodiment, the high-priority UCI comprises a URLLC Service Type HARQ-ACK codebook.

In one subembodiment, the low-priority service data comprises eMBB Service Type service data.

In one subembodiment, the first condition set comprises a Timeline condition, for the specific meaning of the Timeline condition, refer to 3GPP TS38.213, Section 9.2.5.

In one subembodiment, the condition in the first condition set is a Timeline condition related to at least one of $$T_{proc,1}^{mux}, T_{proc,2}^{mux}, T_{proc,release}^{mux} \text{ or } T_{proc,CSI}^{mux};$$

for the specific meaning of the Timeline condition, refer to 3GPP TS38.213, Section 9.2.5; specific meanings of the $$T_{proc,1}^{mux}, \text{ the } T_{proc,2}^{mux}, \text{ the } T_{proc,release}^{mux}$$

and the $$T_{proc,CSI}^{mux}$$

can also be found in 3GPP TS38.213, Section 9.2.5.

In one subembodiment, the first condition set comprises a condition indicating that the PUSCH can support transmitting of the first bit block.

In one subembodiment, the phrase that a first condition set is fulfilled comprises that all conditions in the first condition set are being fulfilled.

In one embodiment, a first condition set is fulfilled; the first radio resource block comprises a PUCCH, and the second radio resource block comprises a PUSCH, the PUCCH and the PUSCH being overlapping in time domain; the PUCCH is reserved for transmitting the first bit block, while the PUSCH is reserved for transmitting the second bit block; the first bit block comprises high-priority UCI, while the second bit block comprises low-priority service data; an end time of the PUCCH in time domain is the first time; a number of bits comprised in the first bit block is used to determine a third time; when the third time is later than the first time in time domain, a number of bits comprised in the first bit block is used to determine the second time, the second time being later than the first time in time domain, and a time gap between the second time and the first time is used to determine whether bits in the second bit block are used for generating the target signal.

In one subembodiment, when the third time is later than the first time in time domain: the second time is the third time; when a time gap between the second time and the first time is no greater than the first threshold, bits in the second bit block are used for generating the target signal, the target radio resource block being the PUSCH, where the first bit block and bits generated by the second bit block are transmitted in the PUSCH; when a time gap between the second time and the first time is greater than the first threshold, bits in the second bit block are not used for generating the target signal, the target radio resource block being the PUCCH, with the first bit block being transmitted in the PUCCH; the first threshold is greater than 0.

In one subembodiment, when the third time is no later than the first time in time domain, bits in the second bit block are used for generating the target signal.

In one subembodiment, the high-priority UCI comprises a URLLC Service Type HARQ-ACK codebook.

In one subembodiment, the low-priority service data comprises eMBB Service Type service data.

In one subembodiment, the first condition set comprises a Timeline condition, for the specific meaning of the Timeline condition, refer to 3GPP TS38.213, Section 9.2.5.

In one subembodiment, the condition in the first condition set is a Timeline condition related to at least one of $$T^{mux}_{proc,1}, T^{mux}_{proc,2}, T^{mux}_{proc,release} \text{ or } T^{mux}_{proc,CSI};$$

for the specific meaning of the Timeline condition, refer to 3GPP TS38.213, Section 9.2.5; specific meanings of the $$T^{mux}_{proc,1}, \text{ the } T^{mux}_{proc,2}, \text{ the } T^{mux}_{proc,release}$$

and the $$T^{mux}_{proc,CSI}$$

can also be found in 3GPP TS38.213, Section 9.2.5.

In one subembodiment, the first condition set comprises a condition indicating that the PUSCH can support transmitting of the first bit block.

In one subembodiment, the phrase that a first condition set is fulfilled comprises that all conditions in the first condition set are being fulfilled.

Embodiment 12A

Figure 12A:
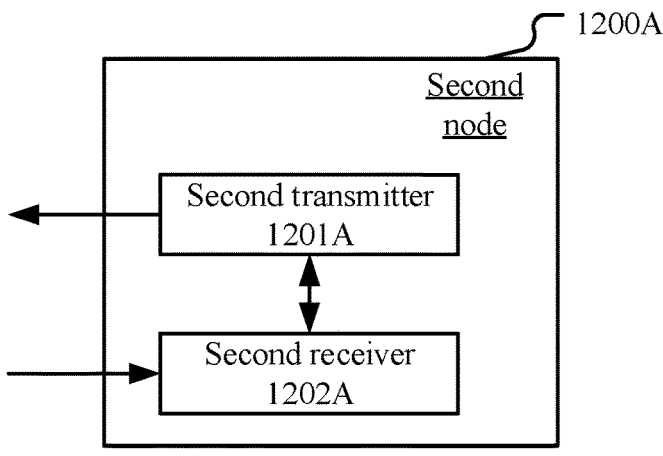
FIG. 12A illustrates a structure block diagram a processing device in a second node according to one embodiment of the present application.

Embodiment 12A illustrates a structure block diagram of a processing device in a second node according to one embodiment of the present application, as shown in FIG. 12A. In FIG. 12A, a processing device 1200A in a second node comprises a second transmitter 1201A and a second receiver 1202A.

In one embodiment, the second node 1200A is a UE.

In one embodiment, the second node 1200A is a base station.

In one embodiment, the second node 1200A is a relay node.

In one embodiment, the second node 1200A is vehicle-mounted communication equipment.

In one embodiment, the second node 1200A is UE supporting V2X communications.

In one embodiment, the second transmitter 1201A comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1201A comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1201A comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1201A comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1201A comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1202A comprises at least one of the antenna 420, the receiver 418, the multi-antenna receiving processor 472, the receiving processor 470, the controller/processor 475 or the memory 476 in FIG. 4 of the present application.

In one embodiment, the second receiver 1202A comprises at least the first five of the antenna 420, the receiver 418, the multi-antenna receiving processor 472, the receiving processor 470, the controller/processor 475 and the memory 476 in FIG. 4 of the present application.

In one embodiment, the second receiver 1202A comprises at least the first four of the antenna 420, the receiver 418, the multi-antenna receiving processor 472, the receiving processor 470, the controller/processor 475 and the memory 476 in FIG. 4 of the present application.

In one embodiment, the second receiver 1202A comprises at least the first three of the antenna 420, the receiver 418, the multi-antenna receiving processor 472, the receiving processor 470, the controller/processor 475 and the memory 476 in FIG. 4 of the present application.

In one embodiment, the second receiver 1202A comprises at least the first two of the antenna 420, the receiver 418, the multi-antenna receiving processor 472, the receiving processor 470, the controller/processor 475 and the memory 476 in FIG. 4 of the present application.

In Embodiment 12A, the second transmitter 1201A transmits first information; and the second receiver 1202A receives a first signal in a first time-frequency resource block, the first signal carrying a second bit block; herein, a first bit block is used for generating the second bit block; the first bit block comprises a first bit sub-block and a second bit sub-block, where a priority corresponding to the first bit sub-block is higher than a priority corresponding to the second bit sub-block; a number of Resource Elements (REs) in the first time-frequency resource block used for transmitting the second bit block is no greater than a first value, a number of bits comprised in the first bit sub-block being used to determine the first value; the number of bits comprised in the first bit sub-block and the first information are used together to determine a second value; a number of REs in the first time-frequency resource block used for transmitting bits associated with the first bit sub-block comprised in the second bit block is equal to a minimum value between the first value and the second value.

In one embodiment, the first value is unrelated to the first information.

In one embodiment, the first value is no greater than a first candidate value and no less than a second candidate value; a first parameter is used to determine the first candidate value, while a second parameter is used to determine the second candidate value; the first parameter and the second parameter respectively correspond to a first priority and a second priority; the priority corresponding to the first bit sub-block is the first priority, and the priority corresponding to the second bit sub-block is the second priority.

In one embodiment, a target parameter is used to determine the first value; the target parameter is a first parameter or a second parameter, the first parameter and the second parameter respectively corresponding to a first priority and a second priority; the priority corresponding to the first bit sub-block is the first priority, and the priority corresponding to the second bit sub-block is the second priority; the number of bits comprised in the first bit sub-block and a number of bits comprised in the second bit sub-block are used together to determine the target parameter.

In one embodiment, when a second value is greater than the second candidate value, the first value is the first candidate value; when the second value is no greater than the second candidate value, the first value is the second candidate value.

In one embodiment, the second transmitter 1201A transmits a first signaling and a second signaling; herein, the first signaling indicates a first radio resource block, while the second signaling indicates a second radio resource block; at least one of the first radio resource block or the second radio resource block is overlapping with the first time-frequency resource block in time domain.

In one embodiment, the first signal carries a third bit block; the first time-frequency resource block is a time-frequency resource block configured for the third bit block; the third bit block is the first-type bit block between a first-type bit block and a second-type bit block.

Embodiment 12B

Figure 12B:
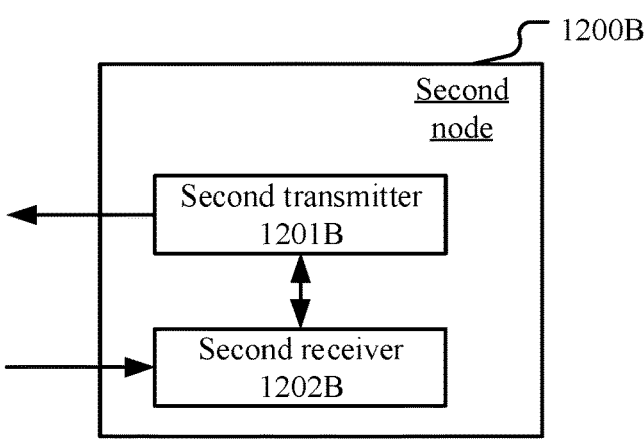
FIG. 12B illustrates a structure block diagram a processing device in a second node according to one embodiment of the present application.

Embodiment 12B illustrates a structure block diagram of a processing device in a second node according to one embodiment of the present application, as shown in FIG. 12B. In FIG. 12B, a processing device 1200B in a second node comprises a second transmitter 1201B and a second receiver 1202B.

In one embodiment, the second node 1200B is a UE.

In one embodiment, the second node 1200B is a base station.

In one embodiment, the second node 1200B is a relay node.

In one embodiment, the second node 1200B is vehicle-mounted communication equipment.

In one embodiment, the second node 1200B is UE supporting V2X communications.

In one embodiment, the second transmitter 1201B comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1201B comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1201B comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1201B comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1201B comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1202B comprises at least one of the antenna 420, the receiver 418, the multi-antenna receiving processor 472, the receiving processor 470, the controller/processor 475 or the memory 476 in FIG. 4 of the present application.

In one embodiment, the second receiver 1202B comprises at least the first five of the antenna 420, the receiver 418, the multi-antenna receiving processor 472, the receiving processor 470, the controller/processor 475 and the memory 476 in FIG. 4 of the present application.

In one embodiment, the second receiver 1202B comprises at least the first four of the antenna 420, the receiver 418, the multi-antenna receiving processor 472, the receiving processor 470, the controller/processor 475 and the memory 476 in FIG. 4 of the present application.

In one embodiment, the second receiver 1202B comprises at least the first three of the antenna 420, the receiver 418, the multi-antenna receiving processor 472, the receiving processor 470, the controller/processor 475 and the memory 476 in FIG. 4 of the present application.

In one embodiment, the second receiver 1202B comprises at least the first two of the antenna 420, the receiver 418, the multi-antenna receiving processor 472, the receiving processor 470, the controller/processor 475 and the memory 476 in FIG. 4 of the present application.

In Embodiment 12B, the second transmitter 1201B transmits a first signaling and a second signaling, the first signaling and the second signaling respectively being used to determine a first radio resource block and a second radio resource block; and the second receiver 1202B receives a target signal in a target radio resource block; herein, the first radio resource block is reserved to be used for transmitting a first bit block, while the second radio resource block is reserved to be used for transmitting a second bit block, time-domain resources occupied by the first radio resource block and time-domain resources occupied by the second radio resource block being overlapping; the first bit block is used for generating the target signal; the target radio resource block is the first radio resource block, or, the target radio resource block is the second radio resource block; an end time of the first radio resource block in time domain is a first time, and a number of bits comprised in the first bit block is used to determine a second time; the second time is no earlier than the first time in time domain; a time gap between the second time and the first time is used to determine whether bits in the second bit block are used for generating the target signal; the first bit block and the second bit block respectively correspond to different types.

In one embodiment, the second time is after the first time in time domain.

In one embodiment, when a time gap between the second time and the first time is no greater than a first threshold, bits in the second bit block are used for generating the target signal, the target radio resource block being the second radio resource block; when a time gap between the second time and the first time is greater than the first threshold, bits in the second bit block are not used for generating the target signal, the target radio resource block being the first radio resource block.

In one embodiment, the first threshold is greater than 0.

In one embodiment, when bits comprised in the second bit block are used for generating the target signal, the second time is an end time of time-domain resources occupied by a modulation symbol generated by the first bit block; the second time is before an end time of the second radio resource block in time domain.

In one embodiment, the second transmitter 1201B transmits a first signal; herein, the first signal carries a third bit block, the first signaling comprising scheduling information of the third bit block, the first bit block comprising information indicating whether the third bit block is correctly received.

In one embodiment, when bits comprised in the second bit block are used for generating the target signal, time-domain resources before those occupied by a reference signal which is earliest in time domain in the target radio resource block are used for transmitting bits associated with the first bit block.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A node for wireless communications, the node comprising:

a transceiver; and a processor, wherein the transceiver and the processor are configured to:

receive first information, generate a second bit block based on a first bit block, and transmit a first signal in a first time-frequency resource block, wherein the first signal carries the second bit block, and wherein the first bit block comprises a first bit sub-block and a second bit sub-block, and wherein a priority corresponding to the first bit sub-block is higher than a priority corresponding to the second bit sub-block, and wherein a number of Resource Elements (REs) in the first time-frequency resource block used for transmitting the second bit block is no greater than a first value, a number of bits comprised in the first bit sub-block being used to determine the first value, and wherein the number of bits comprised in the first bit sub-block and the first information are used together to determine a second value; a number of the REs in the first time-frequency resource block used for transmitting bits associated with the first bit sub-block comprised in the second bit block is equal to a minimum value between the first value and the second value, and wherein on a condition that the second value is greater than a second candidate value, the first value is a first candidate value, and wherein on a condition that the second value is no greater than the second candidate value, the first value is the second candidate value.

2. The node according to claim 1, wherein the first information is configured by higher layer, and wherein the bits associated with the first bit sub-block comprised in the second bit block include all bits in the first bit sub-block.

3. The node according to claim 1, wherein the first value is no greater than the first candidate value and no less than the second candidate value, and wherein a first parameter is used to determine the first candidate value, while a second parameter is used to determine the second candidate value, and wherein the first parameter and the second parameter respectively correspond to a first priority and a second priority, and wherein a priority corresponding to the first bit sub-block is the first priority, and a priority corresponding to the second bit sub-block is the second priority.

4. The node according to claim 1, wherein a target parameter is used to determine the first value, and wherein the target parameter is a first parameter or a second parameter, the first parameter and the second parameter respectively corresponding to a first priority and a second priority, and wherein a priority corresponding to the first bit sub-block is the first priority, and a priority corresponding to the second bit sub-block is the second priority, and wherein a number of bits comprised in the first bit sub-block and a number of bits comprised in the second bit sub-block are used together to determine the target parameter.

5. The node according to claim 4, wherein a first proportion is used to determine whether the target parameter is a first parameter or a second parameter, the first proportion being a ratio of the number of the bits comprised in the first bit sub-block to the number of the bits comprised in the second bit sub-block.

6. The node according to claim 3, wherein on a condition that the first value is the first candidate value, the first bit sub-block is used for generating all or partial bits comprised in the second bit block, the second bit sub-block not being used for generating any bit comprised in the second bit block, and wherein on a condition that the first value is the second candidate value, the first bit sub-block is used for generating some bits comprised in the second bit block, the second bit sub-block being used for generating the other bits comprised in the second bit block.

7. A node for wireless communications, the node comprising:
a transceiver; and
a processor, wherein the transceiver and the processor are configured to:
transmit first information, and
receive a first signal in a first time-frequency resource block, wherein the first signal carries a second bit block,
wherein a first bit block is used for generating the second bit block, and
wherein the first bit block comprises a first bit sub-block and a second bit sub-block, where a priority corresponding to the first bit sub-block is higher than a priority corresponding to the second bit sub-block, and
wherein a number of Resource Elements (REs) in the first time-frequency resource block used for transmitting the second bit block is no greater than a first value, a number of bits comprised in the first bit sub-block being used to determine the first value, and
wherein the number of bits comprised in the first bit sub-block and the first information are used together to determine a second value; a number of the REs in the first time-frequency resource block used for transmitting bits associated with the first bit sub-block comprised in the second bit block is equal to a minimum value between the first value and the second value, and
wherein on a condition that the second value is greater than a second candidate value, the first value is a first candidate value, and
wherein on a condition that the second value is no greater than the second candidate value, the first value is the second candidate value.

8. The node according to claim 7, wherein the bits associated with the first bit sub-block comprised in the second bit block include all bits in the first bit sub-block.

9. The node according to claim 7, wherein the first value is no greater than the first candidate value and no less than the second candidate value, and
wherein a first parameter is used to determine the first candidate value, while a second parameter is used to determine the second candidate value, and
wherein the first parameter and the second parameter respectively correspond to a first priority and a second priority, and
wherein a priority corresponding to the first bit sub-block is the first priority, and a priority corresponding to the second bit sub-block is the second priority.

10. The node according to claim 7, wherein a target parameter is used to determine the first value, and
wherein the target parameter is a first parameter or a second parameter, the first parameter and the second parameter respectively corresponding to a first priority and a second priority, and
wherein a priority corresponding to the first bit sub-block is the first priority, and a priority corresponding to the second bit sub-block is the second priority, and
wherein a number of bits comprised in the first bit sub-block and a number of bits comprised in the second bit sub-block are used together to determine the target parameter.

11. The node according to claim 10, wherein a first proportion is used to determine whether the target parameter is a first parameter or a second parameter, the first proportion being a ratio of the number of the bits comprised in the first bit sub-block to the number of the bits comprised in the second bit sub-block.

12. A method in a node for wireless communications, the method comprising:
receiving first information; and
transmitting a first signal in a first time-frequency resource block, the first signal carrying a second bit block,
wherein a first bit block is used for generating the second bit block, and
wherein the first bit block comprises a first bit sub-block and a second bit sub-block, where a priority corresponding to the first bit sub-block is higher than a priority corresponding to the second bit sub-block, and
wherein a number of Resource Elements (REs) in the first time-frequency resource block used for transmitting the second bit block is no greater than a first value, a number of bits comprised in the first bit sub-block being used to determine the first value, and
wherein the number of bits comprised in the first bit sub-block and the first information are used together to determine a second value, and
wherein a number of the REs in the first time-frequency resource block used for transmitting bits associated with the first bit sub-block comprised in the second bit block is equal to a minimum value between the first value and the second value, and
wherein on a condition that the second value is greater than a second candidate value, the first value is a first candidate value, and
wherein on a condition that the second value is no greater than the second candidate value, the first value is the second candidate value.

13. The method in the node according to claim 12, wherein the first information is configured by higher layer; the bits associated with the first bit sub-block comprised in the second bit block include all bits in the first bit sub-block.

14. The method in the node according to claim 12, wherein the first value is no greater than the first candidate value and no less than the second candidate value, and
wherein a first parameter is used to determine the first candidate value, while a second parameter is used to determine the second candidate value, and
wherein the first parameter and the second parameter respectively correspond to a first priority and a second priority, and
wherein a priority corresponding to the first bit sub-block is the first priority, and a priority corresponding to the second bit sub-block is the second priority.

15. The method in the node according to claim 12, wherein a target parameter is used to determine the first value, and
wherein the target parameter is a first parameter or a second parameter, the first parameter and the second parameter respectively corresponding to a first priority and a second priority, and
wherein a priority corresponding to the first bit sub-block is the first priority, and a priority corresponding to the second bit sub-block is the second priority, and
wherein a number of bits comprised in the first bit sub-block and a number of bits comprised in the second bit sub-block are used together to determine the target parameter.

16. The method in the node according to claim 15, wherein a first proportion is used to determine whether the target parameter is a first parameter or a second parameter, the first proportion being a ratio of the number of the bits comprised in the first bit sub-block to the number of the bits comprised in the second bit sub-block.

17. The method in the node according to claim 14, wherein on a condition that the first value is the first candidate value, the first bit sub-block is used for generating all or partial bits comprised in the second bit block, the second bit sub-block not being used for generating any bit comprised in the second bit block, and wherein on a condition that the first value is the second candidate value, the first bit sub-block is used for generating some bits comprised in the second bit block, the second bit sub-block being used for generating the other bits comprised in the second bit block.

* * * * *